United States Patent
Tounsi

(10) Patent No.: US 11,102,698 B2
(45) Date of Patent: Aug. 24, 2021

(54) TABU NODE SELECTION WITH MINIMUM SPANNING TREE FOR WSNS

(71) Applicant: Prince Sultan University, Riyadh (SA)

(72) Inventor: Mohamed Tounsi, Riyadh (SA)

(73) Assignee: Prince Sultan University, Riyadh (SA)

( * ) Notice: Subject to any disclaimer, the term of this patent is extended or adjusted under 35 U.S.C. 154(b) by 46 days.

(21) Appl. No.: 16/729,893

(22) Filed: Dec. 30, 2019

(65) Prior Publication Data

US 2021/0204190 A1    Jul. 1, 2021

(51) Int. Cl.

| | |
|---|---|
| *H04W 40/10* | (2009.01) |
| *H04W 84/18* | (2009.01) |
| *H04W 40/24* | (2009.01) |
| *H04L 12/721* | (2013.01) |
| *H04W 4/38* | (2018.01) |

(Continued)

(52) U.S. Cl.
CPC ........... *H04W 40/10* (2013.01); *H04L 45/127* (2013.01); *H04L 45/48* (2013.01); *H04W 4/38* (2018.02); *H04W 40/246* (2013.01); *H04W 40/28* (2013.01); *H04W 84/18* (2013.01)

(58) Field of Classification Search
CPC ..... H04W 40/00–10; H04W 40/24–32; H04W 4/30–48; H04W 84/18–22; H04W 52/04; H04W 52/06; H04W 52/18; H04W 52/38; H04L 12/462; H04L 45/00;

(Continued)

(56) References Cited

U.S. PATENT DOCUMENTS

| 7,159,035 B2 | 1/2007 | Garcia-Luna-Aceves et al. |
| 7,924,728 B2 * | 4/2011 | Riga ..................... G01D 21/00 370/238 |

(Continued)

FOREIGN PATENT DOCUMENTS

| CN | 101827418 B | 5/2012 |
| CN | 103228023 A | 7/2013 |

(Continued)

OTHER PUBLICATIONS

Ada Gogu, et al., "Review of Optimization Problems in Wireless Sensor Networks", Telecommunications Networks—Current Status and Future Trends, www.intechopen.com, Chapter 7, 2012, pp. 153-180.

(Continued)

*Primary Examiner* — Warner Wong
(74) *Attorney, Agent, or Firm* — Oblon, McClelland, Maier & Neustadt, L.L.P.

(57) ABSTRACT

A wireless sensor network node selection that efficiently manages active nodes using a Tabu heuristic coupled with minimum spanning tree routing protocol (TNS-MST) is presented. Nodal energy consumption is balanced to ensure all nodes are operating at the same energy level. To balance the energy consumption, nodes with high energy depletion are removed from routing by placing on them a Tabu list, which prevents the most used nodes, such as nodes close to a base station, from draining before their neighbors. The nodes in the Tabu lists are dynamically active according to the energy level of neighboring nodes. The Tabu list combined with Minimum Spanning Tree routing protocol, TNS-MST, greatly increases network lifetime by optimally balancing the energy of the sensor nodes.

18 Claims, 21 Drawing Sheets

(51) Int. Cl.
*H04W 40/28* (2009.01)
*H04L 12/753* (2013.01)

(58) Field of Classification Search
CPC ....... H04L 45/02; H04L 45/127; H04L 45/48; H04L 41/0636; H04L 415/48
See application file for complete search history.

(56) References Cited

U.S. PATENT DOCUMENTS

| | | | | |
|---|---|---|---|---|
| 7,979,096 | B1* | 7/2011 | Elliott | H04W 56/00 455/572 |
| 9,491,060 | B1* | 11/2016 | Bernardo de Oliveira | H04L 41/12 |
| 2006/0105709 | A1* | 5/2006 | Oh | H04W 88/04 455/13.1 |
| 2008/0232258 | A1* | 9/2008 | Larsson | H04L 45/123 370/238 |
| 2009/0168670 | A1* | 7/2009 | Yang | H04L 67/12 370/254 |
| 2009/0190494 | A1* | 7/2009 | De Giovanni | H04L 45/28 370/254 |
| 2011/0228777 | A1* | 9/2011 | Samajpati | H04W 40/26 370/392 |
| 2012/0198092 | A1* | 8/2012 | Sheridan | H04L 12/6418 709/241 |
| 2013/0279918 | A1* | 10/2013 | Mizutani | H04L 12/12 398/135 |
| 2013/0315257 | A1* | 11/2013 | Welin | H04L 45/12 370/401 |
| 2014/0379896 | A1* | 12/2014 | Vasseur | H04L 43/0805 709/224 |
| 2015/0195176 | A1* | 7/2015 | Vasseur | H04L 43/12 709/224 |
| 2017/0019830 | A1* | 1/2017 | Lindoff | H04W 40/22 |
| 2017/0150417 | A1* | 5/2017 | Baroudi | H04W 24/02 |
| 2020/0322868 | A1* | 10/2020 | Claffey | H04W 40/02 |
| 2020/0367133 | A1* | 11/2020 | Matsuura | H04W 40/34 |
| 2020/0383170 | A1* | 12/2020 | Ganapathy | H04L 45/124 |

FOREIGN PATENT DOCUMENTS

| | | |
|---|---|---|
| CN | 106817738 A | 6/2017 |
| EP | 1 835 668 A1 | 9/2007 |

OTHER PUBLICATIONS

Onur Yilmaz, et al., "Shortest hop multipath algorithm for wireless sensor networks", Computers and Mathematics With Applications, vol. 63, 2012, pp. 48-59.

* cited by examiner

TABU NODE SELECTION WITH MINIMUM SPANNING TREE FOR WSNS

BACKGROUND

Technical Field

The present disclosure is directed to methods for node selection in wireless sensor networks (WSN) by a Tabu Node Selection and Minimum Spanning Tree (TNS-MST) procedure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wireless sensor networks (WSNs) have been deployed in many areas, such as environmental monitoring, security and weather/climate observations. A WSN consists of a set of sensors, named nodes, with wireless communication capability and limited energy capacity. A wireless sensor network may include hundreds of sensors/nodes. The nodes have the sensing capability and wireless communication ability to send data to other sensors or base station/sink. The base station or sink is a special sensor, which has greater power capacity and high computation capability. Each sensor has a predefined task and a small power capacity. The sensors are deployed in different areas, so as to cover the intended targets and guarantee maximum sensing coverage. All sensors may route data or collect it from their environment.

There are many real life applications for WSNs, such as fire detection, military surveillance, monitoring, and physiological monitoring of patients, wild fire surveillance, grid monitoring, water distribution monitoring and others. Due to their limited capacity, one of the main challenges for WSNs is to increase the network lifetime by performing data routing that consumes less energy. Challenges may include aspects of node deployment, data routing, optimizing energy consumption, ensuring QoS with node/link heterogeneity, increasing scalability, maximizing the network coverage and improving data aggregation. Further challenges to the development of wireless sensor networks are to increase network lifetime with limited capacity, effectively route data and to achieve maximum network coverage.

The lifetime of a sensor network is defined as the time period until the first node runs out of battery (minimum individual node lifetime), as defined by Chang et al. and Hou et al., or until a certain percentage of the network nodes go flat (nth minimum individual node lifetime), as defined by Blough et al. (See Jae-Hwan Chang and L. Tassiulas (2004). "Maximum lifetime routing in wireless sensor networks". Networking, IEEE/ACM Transactions on, 12(4):609-619; Y. T. Hou, Y. Shi, J. Pan, and S. F. Midkiff (2006). "Maximizing the lifetime of wireless sensor networks through optimal single-session flow routing". Mobile Computing, IEEE Transactions on, 5(9):1255-1266; and Douglas M. Blough and Paolo Santi (2002). "Investigating upper bounds on network lifetime extension for cell-based energy conservation techniques in stationary ad hoc networks". In Proceedings of the ACM/IEEE MOBICOM, pages 183-192. ACM Press, each incorporated herein by reference in their entirety).

Increasing the network lifetime is a challenging problem. Many approaches have been attempted which use Tabu search formalism. Tabu search is a metaheuristic search method employing local search methods with mathematical optimization.

In comparison, local (neighborhood) searches take a potential solution to a problem and check its immediate neighbors (that is, solutions that are similar except for very few minor details) in the hope of finding an improved solution. Local search methods have a tendency to become stuck in suboptimal regions or on plateaus where many solutions are equally fit.

Tabu search enhances the performance of local search by relaxing its basic rule. First, at each step, worsening moves can be accepted if no improving move is available (as when the search is stuck at a strict local minimum). In addition, prohibitions (henceforth the term "tabu") are introduced to discourage the search from coming back to previously-visited solutions.

The implementation of Tabu search uses memory structures that describe the visited solutions or user-provided sets of rules. If a potential solution has been previously visited within a certain short-term period or if it has violated a rule, it is marked as "Tabu" (forbidden) so that the algorithm does not consider that possibility repeatedly.

Jaffres-Runser et al. provided a detailed formalism for using Tabu search for solving multi-objective optimization problems in WLAN. A Tabu search was used to find multiple paths in routing under several objectives. (See Katia Jaffres-Runser, Jean-Marie Gorce (2009), "A multi-objective Tabu framework for the optimization and evaluation of wireless systems", incorporated herein by reference in its entirety).

It has been shown that Tabu search and the Tabu concept provide a benefit towards solving real life problems. (See Glover, F. (1989). "Tabu search—Part I. ORSA Journal on Computing", 1(1), 190-206, incorporated herein by reference in its entirety).

Wireless sensor network related challenges are: saving residual energy, increasing network lifetime and achieving maximum throughput with high quality of service. Some inherent problems are related to WSNs, such as node and base station deployment and determining cluster heads.

Clustering using hyper-graph partitioning with a Tabu search has been investigated in an attempt to perform better clustering. The Tabu heuristic solves clustering problems where the number of clusters and cluster heads are unknown beforehand. A variant of the Tabu search consists of performing different types of moves to reallocate nodes to clusters, select cluster heads, and remove existing clusters. (See Sharma, K., & Ghose, M. K. (2010). "Wireless sensor networks: An overview on its security threats". IJCA, Special Issue on "Mobile Ad-hoc Networks" MANETs, 42-45, incorporated herein by reference in its entirety).

A Tabu search based routing algorithm of the variant above has been utilized to find the optimal path from a source to a destination in wireless sensor networks. This approach was shown to improve the design of nodes clusters and network connectivity. (See Orojloo, H. & Haghighat, A. T (2016). "A Tabu search based routing algorithm for wireless sensor networks". Wireless Netw 22: 1711. doi: 10.1007/s11276-015-1060-7, incorporated herein by reference in its entirety).

A routing optimization algorithm was proposed to find a near optimal path from a source to a destination in mobile ad-hoc networks. The algorithm was designed by using a Tabu search, where two moves were used to find the neighborhood nodes needed to determine an optimal path with minimal cost. (See Ang, K. W. (2012). "A Tabu search algorithm for routing optimization in mobile ad-hoc networks". Telecommunication Systems, 51(2-3), 177-191, incorporated herein by reference in its entirety).

Madan et al. presented a routing algorithm to improve network lifetime and reliability. This algorithm combined a Tabu concept along with a multi-criteria algorithm. The selection of nodes for routing is based on the multi-criteria model. Nodes are disallowed for the path if they cannot satisfy the multi-criteria model. (See R. Madan and S. Lall (2006). "Distributed algorithms for maximum lifetime routing in wireless sensor networks". Wireless Communications, IEEE Transactions on, 5(8):2185-2193, incorporated herein by reference in its entirety).

For the QoS multicast routing problem, a Tabu based algorithm was proposed to solve the bandwidth-delay constrained by a least-cost multicast routing problem using a dynamic Tabu list model. (See Armaghan, M., & Haghighat, A. T. (2009). "QoS multicast routing algorithms based on Tabu search with hybrid candidate list", In Y. Lee, T. Kim, W. Fang, & D. Ślęzak (Eds.), Future generation information technology, (pp. 285-294), Berlin, Heidelberg: Springer, incorporated herein by reference in its entirety).

A cluster based optimization of routing by employing a Bayesian network (BN) combined with Tabu search approach was proposed. The routing was optimized through cluster head nodes by using a Tabu search heuristic. (See Lokesh B. Bhajantril, Nalini (2014). "Cluster Based Optimization of Routing in Distributed Sensor Networks Using Bayesian Networks with Tabu Search", International Journal of Electronics and Telecommunications, Volume 60, Issue 2, Pages 199-208, incorporated herein by reference in its entirety).

The WSN deployment problem has been modelled as a multi-objective optimization problem, which sought to reduce the gap between generated event detection probabilities and required thresholds while minimizing the number of deployed sensors using a Tabu Search heuristic. (See Aitsaadi, N., Achir, N.; Boussetta, K., Pujolle, G. (2009), "A Tabu Search WSN Deployment Method for Monitoring Geographically Irregular Distributed Events. Sensors". 9, 1625-1643, incorporated herein by reference in its entirety).

A simulated annealing based routing algorithm to determine an optimal path from the source to a destination in wireless sensor networks while using a Tabu search to create different neighbor paths was proposed. (See Robab Mohammadil and Hossein Boroumand Noghabi (2016) "SAT: Simulated Annealing and Tabu Search Based Routing Algorithm for Wireless Sensor Networks", International Journal of Computer Networks and Communications Security, 4 (10), incorporated herein by reference in its entirety).

Another Tabu approach was proposed in order to aggregate data and improve the sensing capabilities of the active nodes. (See Jaspreet Kaurl, R C Gangwar (2015), "Enhanced Tabu Search Based Hybrid Routing Protocols for Wireless Sensor Networks", Advances in Computer Science and Information Technology; 2(12) pp. 15-20, incorporated herein by reference in its entirety).

Similarly, a Tabu search routing protocol using a metaheuristic Tabu search was suggested to route data from a sensor to a base station. Each next sensor was selected based on an energy cost function that calculated the cost in term of energy and distance from the sink of each neighbor. (See F. Semchedine, L. Bouallouche-Medjkoune, L. Bennacer, N. Aber, D. Aïssani (2012), "Routing protocol based on Tabu search for wireless sensor networks", Wireless Personal Communications, Springer US, vol. 67(2), pp. 105-112, incorporated herein by reference in its entirety).

A Tabu search algorithm was proposed to deploy sensor nodes to achieve maximum sensing coverage in wireless sensor networks. Computation of a highly dense WSN used a Tabu search for neighborhood generation. (See Jang, Kil-Woong (2015) "Sensor Node Deployment in Wireless Sensor Networks Based on Tabu Search Algorithm", Journal of the Korea Institute of Information and Communication Engineering, 19(5), incorporated herein by reference in its entirety).

A clustered architecture for energy efficient routing entitled Tabu Swarm Optimization was proposed. The results showed an increase in efficiency while minimizing energy consumption. (See Y. M. Luz and V. Wong (2007). "An energy-efficient multipath routing protocol for wireless sensor networks". Int. J. Commun. Syst., 20:747-766, incorporated herein by reference in its entirety).

Clustering nodes using a Tabu search approach to collect data and reduce energy consumption by using a clustering detection model was proposed. This Tabu search consisted of defining three types of moves that allow reallocation of nodes to clusters. The routing algorithms provided a set of step-by-step operations used to direct data traffic efficiently. When a packet of data left its source, many different paths were found to the destination. The routing algorithm was used to determine mathematically the best path to take. (See R. Evangelin Hema Mariyal, V. Sumathy2, J. Daphney Joann (2012), "Efficient Energy Saving and Maximizing Network Lifetime in WSNs", International Journal of Computer Science & Communication Networks, Vol 2(6), 636-640, incorporated herein by reference in its entirety).

The use of shortest path tree in routing is the most common technique used for routing within WSNs. However, there are issues associated with the shortest path tree, which is the unbalanced load between the sensors and the disparity in the energy used by such nodes. (See Dilo, A., Gogu, A., Meratnia, N., & Nace, D. (2011). "Optimization Problems in Networks". CISIS, incorporated herein by reference in its entirety).

Aspects of the present disclosure describe node selection which combines minimum spanning tree routing with Tabu listing, i.e. Tabu Node Selection and Minimum Spanning Tree (TNS-MST). TNS-MST is demonstrated to fine tune node selection based on energy consumption, resulting in increased residual energy and network lifetime.

SUMMARY

In an exemplary embodiment, a method for node selection in a wireless sensor network is described, comprising determining a minimum path between a first sensor node and a destination node, routing a communications packet along the minimum path from the first sensor node to a next sensor node based on the energy level of the next sensor node being greater than a threshold energy level, turning off the sensor nodes along the minimum path for which the energy level is equal to or below the threshold energy level, and continuing to route the communication packet along the minimum path to each next sensor node until the destination node is reached.

In another exemplary embodiment, a system for node selection in a wireless sensor network including a plurality of sensor nodes and a destination node, comprising turning off, by a processor including a Tabu search module, sensor nodes for which the energy level is equal to or below the threshold energy level and placing those sensor nodes on a Tabu routing list, determining, by a processor including a minimum spanning tree module, a minimum path between a first sensor node and the destination node, wherein the minimum path includes only those nodes not on the Tabu routing list, routing, by a computing system connected to the processor, a communications packet along the minimum path from the first sensor node to a next sensor node on the minimum path, continuing to route the communication packet along the minimum path to each next sensor node until the destination node is reached and continuing the determining for each sensor node in the wireless sensor network until all of the sensor nodes have either been assigned a minimum path or have been turned off.

In another exemplary embodiment, a non-transitory computer readable medium having instructions stored therein that, when executed by one or more processor, cause the one or more processors to perform a method for node selection in a wireless sensor network including a plurality of sensor nodes and a destination node, comprising turning off, by a processor including a Tabu search module, sensor nodes for which the energy level is equal to or below the threshold energy level and placing those sensor nodes on a Tabu routing list, determining, by a processor including a minimum spanning tree module, a minimum path between a first sensor node and the destination node, wherein the minimum path includes only those nodes not on the Tabu routing list, routing, by a computing system connected to the processor, a communications packet along the minimum path from the first sensor node to a next sensor node on the minimum path, continuing to route the communication packet along the minimum path to each next sensor node until the destination node is reached and continuing the determining for each sensor node in the wireless sensor network until all of the sensor nodes have either been assigned a minimum path or have been turned off.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
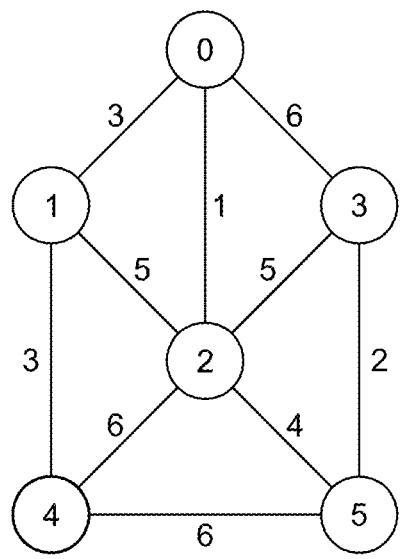
FIG. 1A illustrates a weighted graph.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a method, system for node selection in a wireless sensor network and a non-transitory computer readable medium having instructions stored therein that, when executed by one or more processors, cause the one or more processors to perform a method for node selection in a wireless sensor network including a plurality of sensor nodes and a destination node.

Aspects of the present disclosure describe a minimum spanning tree algorithm developed for routing. PRIM's algorithm is combined with Tabu node selection. The Tabu Node Selection and Minimum Spanning Tree (TNS-MST) algorithm is used to increase residual energy and network lifetime of a wireless sensor network, WSN. A model is developed for creating Tabu lists, a kind of REST list of nodes which are idle for certain rounds. TNS-MST fine tunes the node selection based on energy consumption.

Figure 1B:
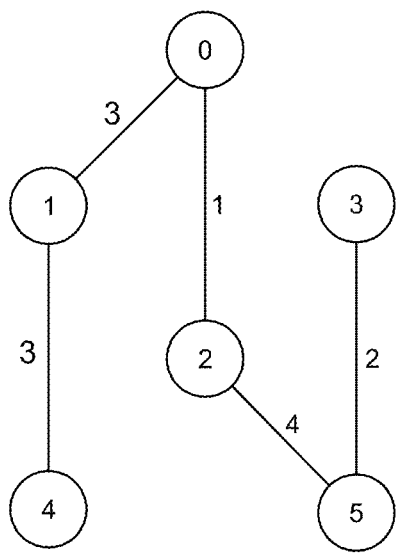
FIG. 1B illustrates a Minimum Spanning Tree of FIG. 1A.

An aspect of the present disclosure uses PRIM's algorithm for routing data, which provides a minimum spanning tree in graphic format. Assuming an undirected, connected graph, a spanning tree of that graph would be a subgraph that connects all the vertices of that tree. A single graph can have many spanning trees. If weights representing energy are assigned to each edge (see numbers on the lines between the circles, FIG. 1A, then the minimum spanning tree, MST, is the spanning tree with weight less than any other spanning tree of that graph. A weighted graph is shown in FIG. 1A, with weights (see 1-6) assigned to each of its branches (nodes 0-5). The tree in FIG. 1B is known as the minimum spanning tree, with total weight equal to 13 (3+3+1+4+2). Many other spanning trees can also be built by connecting the vertices of the given graph in different ways. The routing algorithm of the present disclosure can be described as follows: Consider a weighted connected graph G with n vertices as in FIG. 1A. PRIM's algorithm finds a minimum spanning tree for the connected graph G. PRIM's algorithm is a minimum spanning tree algorithm that takes a graph as input and finds the subset of the edges of that graph which form a tree that includes every vertex and which has the minimum sum of weights among all the trees that can be formed from the graph.

PRIM's Algorithm is shown below.

---
Algorithm 1. PRIM's Algorithm
---
function Prim(G: weighted connected graph with n vertices)
  T := a minimum-weight edge
  for i = 1 to n − 2
  begin
    e := Minimum (edges incident to a vertex in T and
    not forming a circuit in T if added to T
    T := T U e
  end
  return(T)
---

Areas of interest, such as a target or position, are covered by at least one sensor. The algorithm searches for nodes which are the most used in one routing, for these are the nodes that drain the most quickly. Therefore these nodes are entered into a Tabu list which represents nodes which are inactive for a certain period of time. A set of lists are built that represent the nodes covering a target. When the energy level of a node drops to a threshold energy level, it is added to the Tabu list. The sensor node remains on the Tabu list until all the nodes covering the same target reach the threshold energy level. The node is then released from the Tabu list and the selected nodes that should be put into a Tabu list are recomputed.

Figure 2:
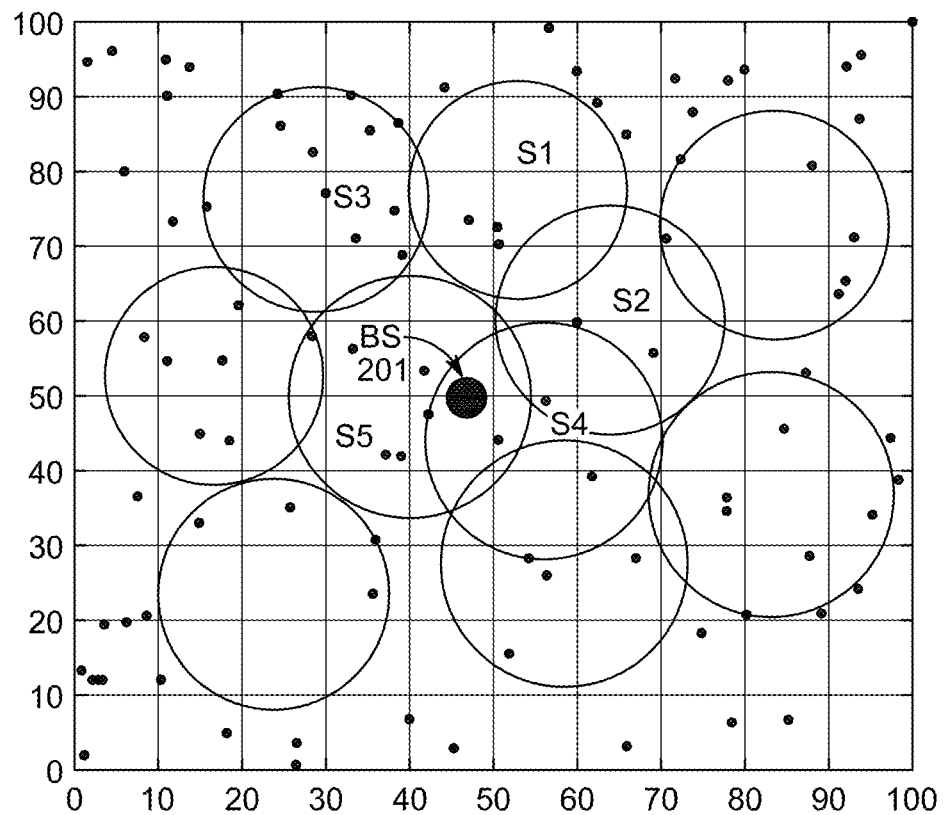
FIG. 2 illustrates the node coverage in WSN.

In the above approach, the nodes that have used their battery power are avoided because once their energy levels have decreased more than others, they will be put "on hold" within the Tabu list for the coming rounds of routing. Because some nodes will "disconnect" from the network, different types of nodes are considered: nodes connected to the base station and nodes that are not connected directly to base station 201 as shown in FIG. 2. A node communicates its remaining battery power to the base station as part of its sensor information packet.

The base station is represented by the large dot. Every circle represents the communication coverage range of each sensor Sensors S1, S2, S3 do not "cover" the base station, while nodes S4, S5 do cover the base station. This segmentation is important to consider differentiation in the algorithm. A node cannot be put on a Tabu list if it is the only one which is connected to the base station in order to prevent the network from being disconnected. Accordingly, for each target $t_i$, a set of nodes $Lt_i$ contains all nodes covering the target $t_i$. Hence, for each target there is a Tabu list named $Tabu_i$. As a result, a set of Tabu lists is developed which represents nodes that could be inactive for a certain period of time according to their energy level.

The routing occurs only on the active nodes. This prevents the nodes from being drained too quickly as the routing is controlled and balanced on all nodes in the network. The pseudo-code of the proposed algorithm is shown below.

---
Algorithm 2. TNS Algorithm Pre - Processing
---
Target-list(i)( ) // Store list of nodes covering target i
Tabu(i) = { } // store list of nodes tabu for target i
E(j) // energy of node j
  // All nodes have same energy at initialization
Energy_level = [50%, 40%, 30%, 20%, 10%, 5%]
WHILE Node_Energy NOT threshold DO
  Compute MST( ) // routing using Minimum Spanning Tree
  IF node(i) reaches Level_energy then
    IF node is NOT last node that covers a target &
    NOT last THEN add node to Tabu(i)
    IF node is the last node, THEN all nodes in Tabu(i)
    will be active nodes
END WHILE
---

The different levels of energy for which the energy value of the node varies were considered. For instance, if a node's energy level dropped 50% from its initial value, the node was added to the Tabu list, $Lt_i$, corresponding to its target, $t_i$. Once the entire set of nodes in the same target node list reached the same energy level of a 50% energy loss, all nodes on the list became active and were removed from the respective Tabu list, ensuring that all nodes covering a target have their energy level decreased in a balanced manner.

Figure 3:
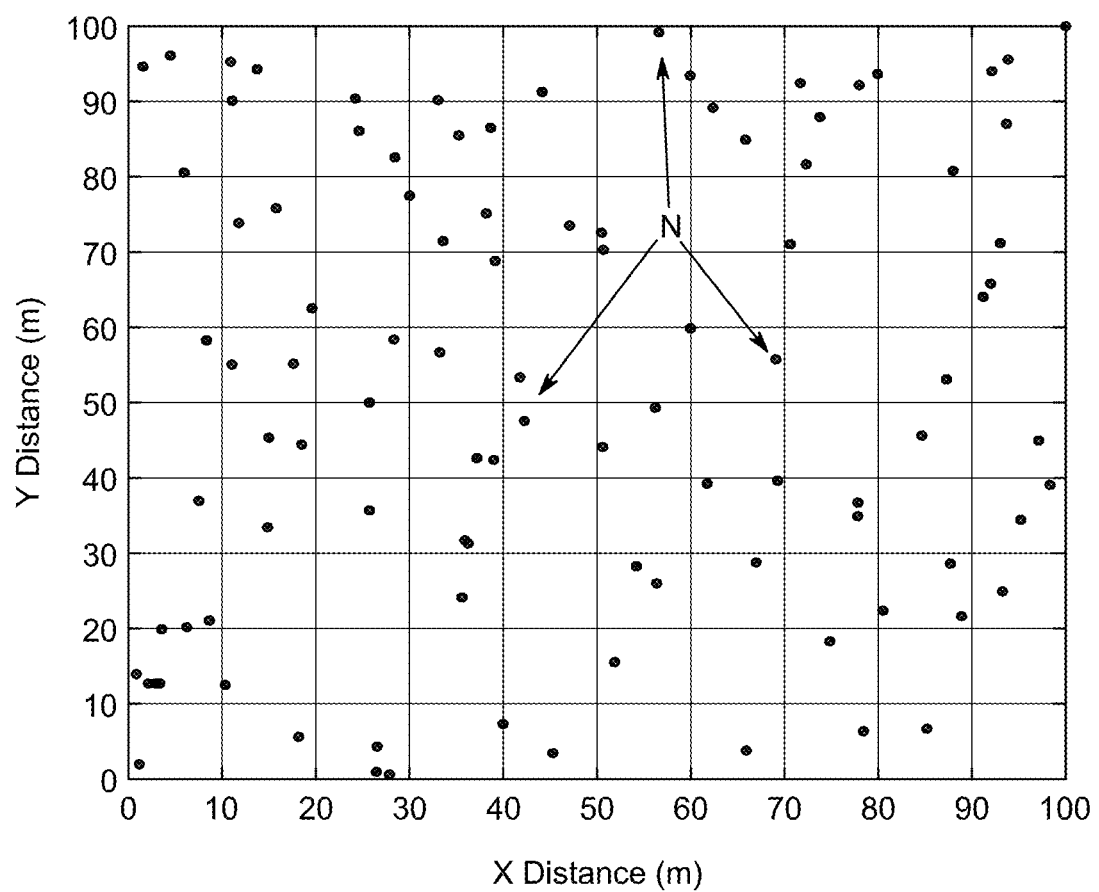
FIG. 3 illustrates the nodes positions with 100×100 grid.

To assess the TNS-MST model, a variety of sizes of region areas ranging from 100×100 to 400×400 m with different node densities were established in which N nodes were uniformly placed as shown in FIG. 3. The number of nodes in the experiment varies from 100 to 400, and the number of rounds varies from 5000 to 20000. Each target was randomly covered by least one node (N). The performance of the Tabu-based approach with Minimum Spanning Tree (MST) routing, TNS-MST, was compared with the Minimum Spanning Tree (MST) routing.

The metrics used for evaluating the performance of the TNS-MST were: network size, network lifetime, the number of dead nodes and the average residual energy. The tests were performed on 16 instance families, represented as $I_x$, and coupled with the different WSN areas, such as 100×100, 200×200 and 400×400. The network density, denoted by $N_d$, represents different small-scale and dense WSNs as shown in Table 1.

TABLE 1

WNS Benchmarks

| # | N | Area | Nd |
|---|---|---|---|
| I1 | 100 | 100 × 100 | 0.01 |
| I2 | 100 | 200 × 200 | 0.0025 |
| I3 | 100 | 300 × 300 | 0.0011 |
| I4 | 100 | 400 × 400 | 0.00625 |
| I5 | 200 | 100 × 100 | 0.02 |
| I6 | 200 | 200 × 200 | 0.005 |
| I7 | 200 | 300 × 300 | 0.0024 |
| I8 | 200 | 400 × 400 | 0.00125 |
| I9 | 300 | 100 × 100 | 0.03 |
| I10 | 300 | 200 × 200 | 0.075 |

TABLE 1-continued

WNS Benchmarks

| # | N | Area | Nd |
|---|---|------|-----|
| I11 | 300 | 300 × 300 | 0.0033 |
| I12 | 300 | 400 × 400 | 0.0018 |
| I13 | 400 | 100 × 100 | 0.02 |
| I14 | 400 | 200 × 200 | 0.01 |
| I15 | 400 | 300 × 300 | 0.004 |
| I16 | 400 | 400 × 400 | 0.025 |

Figure 4:
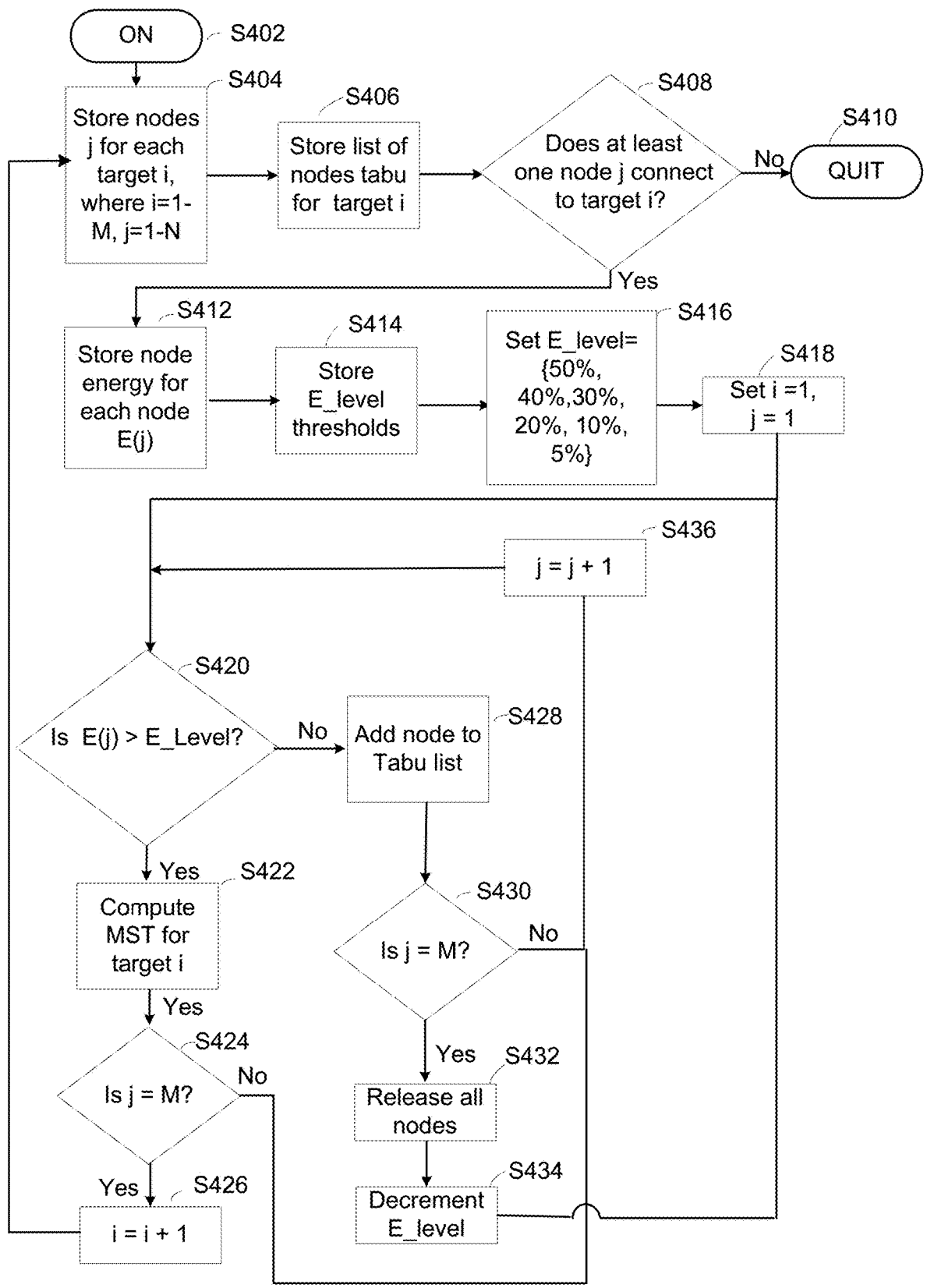
FIG. 4 is a flowchart of TNS-MST process steps.

FIG. 4 is a flowchart of the TNS-MST algorithm. In step 420, the TNS-MST algorithm begins. All nodes and all targets are stored in S404 and S406. For any particular target, there are a set of sensors which communicate with that base station. At step S408, a check is run to ensure that at least one sensor is in direct communication with the base station. If no sensor node directly communicates with the base station, then the process quits, as there is no communication path between the sensor nodes and the base station. This may happen when all of the nodes are at too far of a distance from the base station or if the energy of all of the nodes is too low to enable communication. The energy of each node is stored in memory at S412. A set of selectable energy level thresholds is stored at S414. The TNS-MST algorithm will decrement through the energy level thresholds to balance the energy in the network as it is depleted by long term use. The energy level for the first iteration is set at S416, and the variables i, j are initialized at S418. The energy of the first node is checked as to whether it is greater than the first energy level threshold at S420. If YES, the MST is computed for the communication path between the node and target i using PRIM's algorithm. The node is incremented at S426 and the process returns to S404. If NO, the node is added to the Tabu list at S428. If all the nodes have not been checked (j<M), then j is iterated at S436. If all the nodes have been either assigned a communication path at S422 or added to the Tabu list, all of the nodes on the Tabu list are released at S432 and the energy threshold is decremented at S434 at which time all the nodes are checked as to whether they are greater than the next lowest energy threshold. This process ensures that the energy of all the nodes is balanced.

In a non-limiting example, the Tabu system may be applied to a wireless security monitoring network. Sensors may be placed at doors, windows and other points of entry or concern, such as cash register locations, safes or offices. The base station may be a computer terminal in the monitored area, or may be a remote monitor which receives communication from an internal WiFi router. The sensor nodes may be battery operated or wired to power terminals. Sensor nodes which are not wired may use their battery power quickly if they are in locations which are frequently used, such as an entry door. Additionally, sensor nodes which are close to the computer or WiFi router in the monitored area may be in the MST of many nodes, and thus deplete their battery power more quickly than sensor nodes in less well travelled areas. Referring to FIG. 2, nodes in areas S4 and S5 are more likely to be in the minimum spanning tree of S1, S2, S3 and the other nodes, as these nodes provide a direct communication path to the base station. Therefore, each minimum spanning tree is chosen such that the energy of the nodes in S4 and S5 is balanced, that is, nodes which are depleted more rapidly than neighboring nodes are put to sleep (or allowed to REST in a Tabu list) for a number of cycles until the neighboring nodes are at the same energy level as the "sleeping" node. Once all nodes are at the same energy level, the sleeping nodes are released from the Tabu list and are again allowed to be considered in the MST algorithm as communicators.

Figure 5:
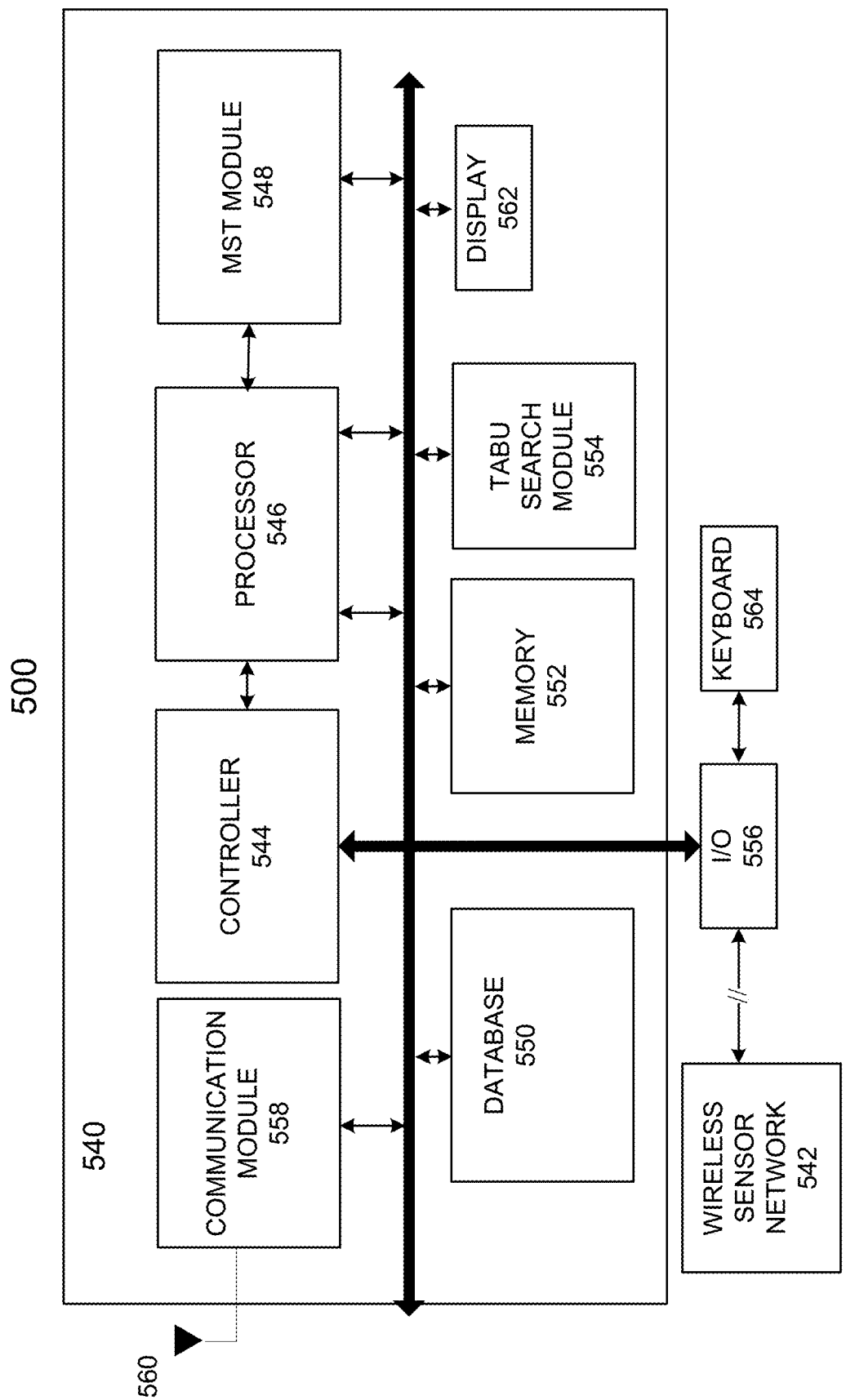
FIG. 5 is a computer system for performing the TNS-MST process steps.

FIG. 5 depicts the computer system 500 which controls the node assignment. Control unit 540 includes controller 544, processor 546, database 550, memory 552, MST module 548 and Tabu search module 554. Data regarding the specific layout and energy parameters of the wireless sensor network 542 are input to the controller either directly through I/O port 556 or wirelessly through communication module 558 connected to transceiver 560. The I/O port may also connect to a keyboard 564 or other peripherals (not shown) for receiving inputs which set thresholds, adjust display parameters, etc. Processor 546 receives the node and target data from the controller 544 and runs PRIM's algorithm in MST module 548 based on a Tabu search run by Tabu search module 554. The processor determines each communication channel and required time out for each node (sensor), which information is forwarded to the controller, which communicates the information to the nodes and base station of the wireless sensor network 542. The database 550 holds the energy level thresholds and Tabu lists. The processor 546 accesses program instructions from memory 552 and may access control settings, system parameters or other information as needed to perform the functions of the processing from the database 550.

The first embodiment is illustrated as shown in FIGS. 4 and 5. The first embodiment describes a method for node selection in a wireless sensor network, comprising determining a minimum path between a first sensor node and a destination node (S422); routing a communications packet along the minimum path from the first sensor node to a next sensor node based on the energy level of the next sensor node being greater than a threshold energy level (S420); turning off the sensor nodes along the minimum path for which the energy level is equal to or below the threshold energy level (S428); and continuing to route (S426) the communication packet along the minimum path to each next sensor node until the destination node is reached.

Turning off the sensor nodes for which the energy level is below the threshold energy level includes placing those sensor nodes on a routing list of inactive nodes (S428). The routing list may be a Tabu list.

Either the first sensor node or the destination node is a base station.

Routing the communications packet along the minimum path is based on a minimum spanning tree algorithm, wherein the minimum spanning tree algorithm may be PRIM's algorithm.

The method includes selecting the next sensor node from any one of the sensor nodes within a communications distance of the first sensor node, wherein the next sensor node is not listed on the Tabu list (S420), and wherein the communications distance is based at least partially on the energy level of the first sensor node.

The method further includes at least one of removing a sensor node from the Tabu list if the energy level of the sensor node equals the energy level of at least one neighboring sensor node, removing a sensor node from the Tabu list when there is no minimum path connecting the first sensor node to the destination node, or removing the sensor nodes from the Tabu list when all the sensor nodes of the wireless sensor network are on the Tabu list (S432).

The method also includes selecting, by a processor 546, the energy level threshold from a set of descending energy level thresholds (S414). The method may include lowering the threshold energy level when all the sensor nodes are on the Tabu list; and removing sensor nodes from the Tabu list which are above the lowered threshold energy level.

Each sensor node in the wireless sensor network not listed on the routing list of inactive nodes is assigned a minimum path to the destination node.

The method balances the energy, increases the residual energy and increases the lifetime of the wireless sensor network by turning off the sensor nodes along each minimum path for which the energy level is equal to or below the threshold energy level.

The second embodiment is illustrated as shown in FIGS. 4 and 5. The second embodiment describes a system for node selection in a wireless sensor network 542 including a plurality of sensor nodes and a destination node, comprising turning off, by a processor 546 including a Tabu search module 554, sensor nodes for which the energy level is equal to or below the threshold energy level and placing those sensor nodes on a Tabu routing list 554, determining, by a processor including a minimum spanning tree module 548, a minimum path between a first sensor node and the destination node, wherein the minimum path includes only those nodes not on the Tabu routing list, routing, by a computing system 540 connected to the processor, a communications packet along the minimum path from the first sensor node to a next sensor node on the minimum path, continuing to route the communication packet along the minimum path to each next sensor node until the destination node is reached and continuing the determining for each sensor node in the wireless sensor network until all of the sensor nodes have either been assigned a minimum path or have been turned off.

The system includes either removing a sensor node from the Tabu list if the energy level of the sensor node equals the energy level of at least one neighboring sensor node or removing all of the sensor nodes from the Tabu list when all of the sensor nodes in the wireless sensor network are on the Tabu list (S432).

The system further includes selecting, by the processor, the energy level threshold from a set of descending energy level thresholds (S414). The system include lowering the threshold energy level (S434) when all the sensor nodes are on the Tabu list and removing the sensor nodes from the Tabu list which are above the lowered threshold energy level.

The system steps result in balancing the energy, increasing the residual energy and increasing the lifetime of the wireless sensor network by turning off the sensor nodes along each minimum path for which the energy level is equal to or below the threshold energy level (S420).

The third embodiment is illustrated with respect to FIGS. 4 and 5. The third embodiment describes a non-transitory computer readable medium having instructions stored therein that, when executed by one or more processor, cause the one or more processors to perform a method for node selection in a wireless sensor network including a plurality of sensor nodes and a destination node, comprising turning off, by a processor including a Tabu search module, sensor nodes for which the energy level is equal to or below the threshold energy level and placing those sensor nodes on a Tabu routing list, determining, by a processor including a minimum spanning tree module, a minimum path between a first sensor node and the destination node, wherein the minimum path includes only those nodes not on the Tabu routing list, routing, by a computing system connected to the processor, a communications packet along the minimum path from the first sensor node to a next sensor node on the minimum path, continuing to route the communication packet along the minimum path to each next sensor node until the destination node is reached, and continuing the determining for each sensor node in the wireless sensor network until all of the sensor nodes have either been assigned a minimum path or have been turned off.

The TNS-MST was simulated using a random sensor node distribution. The base station 201 was placed at the center or close to the center of the network field. The corresponding simulation parameters are shown in Table 2.

TABLE 2

| Simulation Parameters | |
|---|---|
| Parameters | Value |
| Initial energy $E_0$ | 0.5 J |
| Transmitting and receiving energy $E_{elec}$ | 5 nJ/bit |
| Amplification energy for short distance $E_f$ | 10 Pj/bit/m$^2$ |
| Amplification energy for long distance $E_{amp}$ | 0.013 pJ/bit/m$^4$ |
| Packet size | 200 bits |
| Operating frequency | 2.4 GHz |
| Initial energy of sensor | 61,560 J |
| Transmit power | 32 mW |
| Reference distance | 3 m |
| Path loss exponent | 4 |
| SNR | 2 dB |

Computations were made to evaluate TNS-MST with MST routing against MST-only routing. To assess the network lifetime, residual energy as well as throughput, the TNS-MST based model performed fine-tuning to balance energy among nodes and put some nodes into the idle state based on their energy level. FIG. 3 and Tables 1 and 2 depict the WSN behavior for instance I1 (see Table 1) with 5000 rounds. Experiments were designed to explore the Tabu list content for two cases:

i. Base station nodes: BS-list( ): only the nodes connected to the base station are added to the Tabu list, while all the remaining nodes are not.
ii. All network nodes: Network-list( ) all of the network nodes that belong to the Tabu list.
iii. No Tabu list: No-list( ) only the MST( ) algorithm is needed to route and manage these nodes.

BS-list( ) this is the Tabu listing for only the nodes which cover the base station. Energy balancing was performed for these nodes using the TNS( ) algorithm. All other nodes are not added to the Tabu list and their management is done by the MST routing algorithm.

Network-list( ) All of the nodes that can belong to Tabu lists corresponding to their target sets. Hence, this list is a generalization of the previous model (BS-list( ) )

No-list( ) Only the MST routing algorithm is used without considering any Tabu list. Node management is performed using the MST routing algorithm.

The first experiment investigated the effect of only preventing the nodes close to the base station from dying first, as they are the most solicited during the routing and get drained the fastest. A second experiment checked the situation when all qualifying nodes have been relegated to the Tabu list and then preventing the remaining nodes in the network from being drained, as only these remaining nodes can be in the unique routing path. Experiments were conducted for each of the situations represented by: BS-list( ) for option I, Network-list ( ) for option ii, and No-list( ) for option iii.

In the Tabu Node Selection algorithm TNS( ), Tabu list parameters are dynamically updated according to the energy level of the nodes. Hence, it is assumed that when a node is depleted below a certain level of energy, it "drains" more quickly than its neighbors; hence this node is a good candidate for the Tabu list. Thus, such a node becomes inactive. The energy level of nodes varies from 10% depletion to 50% depletion. First, the determination must be made as to which energy level is the best for putting nodes into a Tabu list and performing the energy balancing. In the experiments, the energy level of each node is checked for whether it reaches one of a set of descending levels—e.g. 70%, 60%, 50%, etc. Once a node reaches the specified threshold level, it is added to the Tabu list according to the TNS( ) algorithm.

The results of the algorithm are depicted in the figures for the three variants: BS-list( ) Network-list( ) and No-list( ) for different energy levels.

Figure 6A:
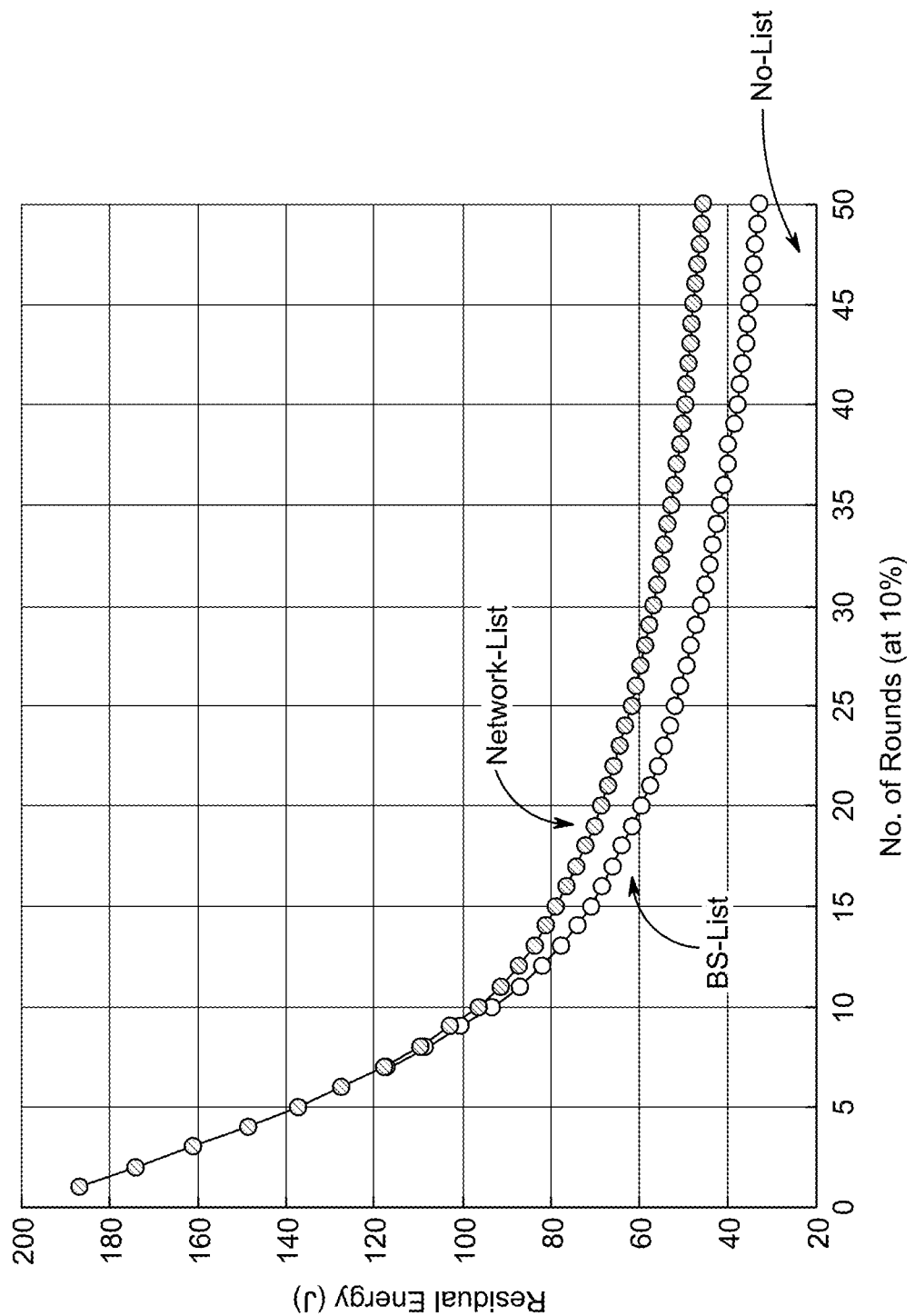
FIG. 6A illustrates the Residual Energy for TNS( ) with all nodes, TNS( ) with BS nodes and MST without Tabu for energy level 10%.
Figure 6B:
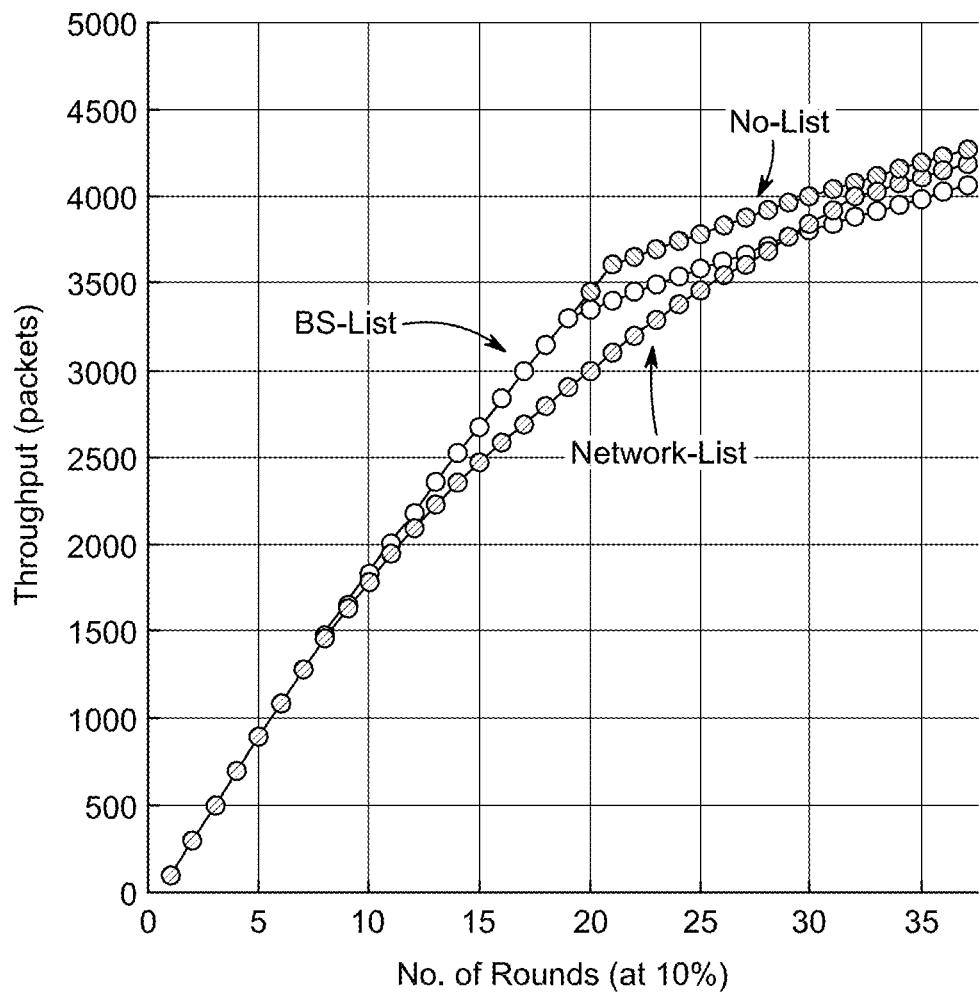
FIG. 6B illustrates the throughput for TNS( ) with all nodes, TNS( ) with BS nodes and MST without Tabu for energy level 10%.
Figure 6C:
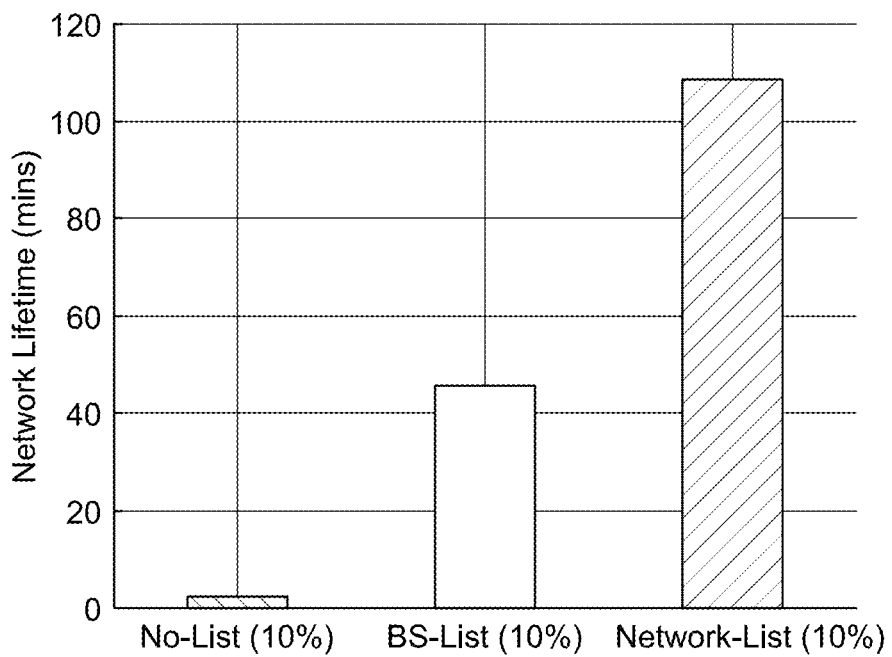
FIG. 6C illustrates the network lifetime for TNS( ) with all nodes, TNS( ) with BS nodes and MST without Tabu for energy level 10%.

FIGS. 6A, 6B and 6C represent the experiments for TNS( ) where, when the energy level of a node reaches 10% remaining energy, the node is added to the Tabu list. As shown in FIG. 6A, the residual energy is higher for Network-list( ) after the first ten rounds. Thus it is more efficient to add nodes to the Tabu list when their energy reaches 10%, than considering adding only the neighbor nodes of the base station. This confirms that the network topology makes the BS-list( ) a sub-case of Network-list( ).

Similarly, for the throughput of packets at an energy level of 10%, all three list variants are at a similar level for higher rounds as shown in FIG. 6B. For the network lifetime shown in FIG. 6C, the Network-list( ) variant outperforms other algorithms, more than double that of the BS-list( ) and much more than if there is no node management(No List), relying only on the MST routing algorithm. This can be explained by the fact that all nodes can belong to the Tabu list, which avoids energy depletion. Most of the nodes will rest for a certain number of rounds to avoid to be drained.

Figure 7A:
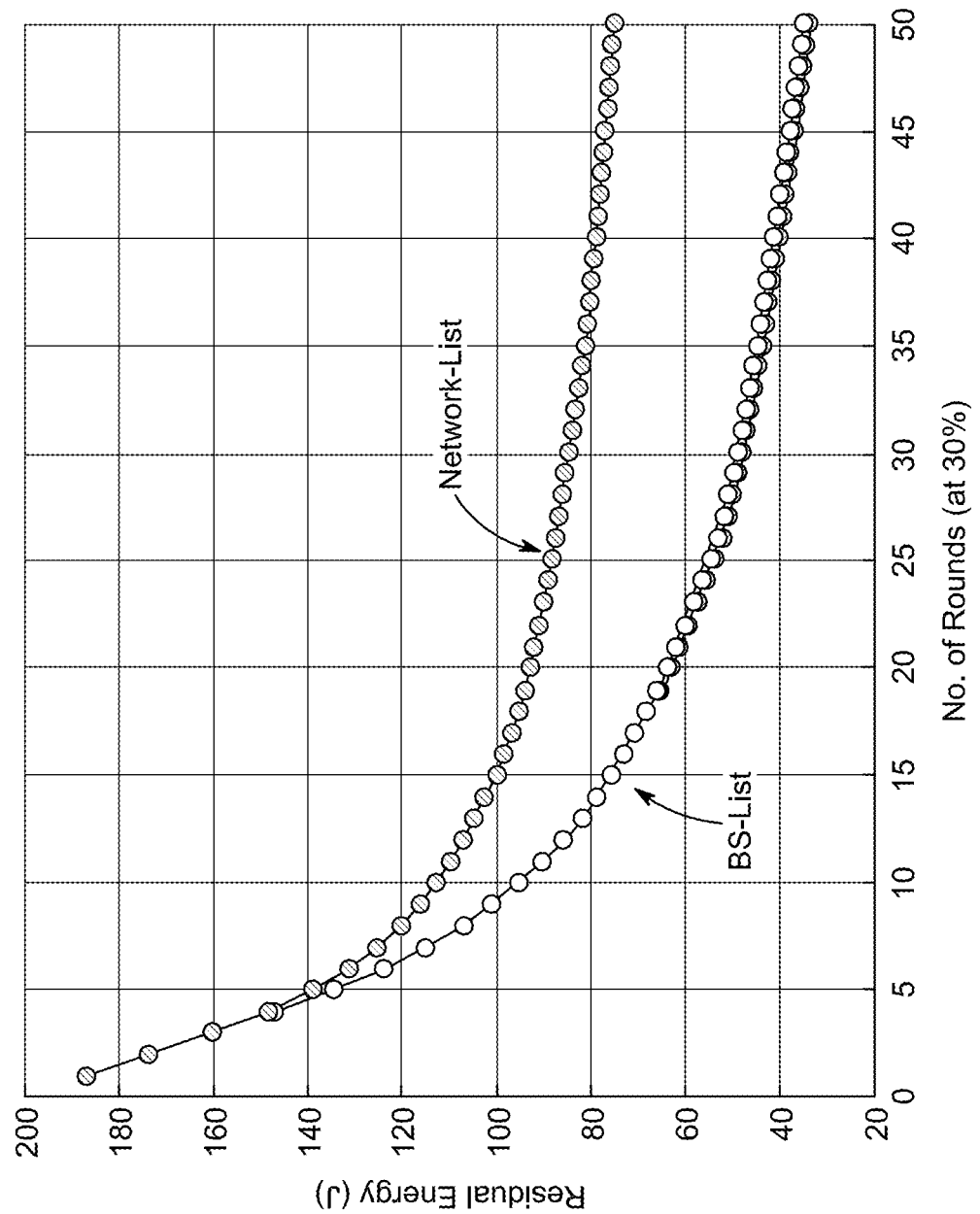
FIG. 7A illustrates the throughput for TNS( ) with all nodes, TNS( ) with BS nodes and MST without Tabu for energy level 30%.
Figure 7B:
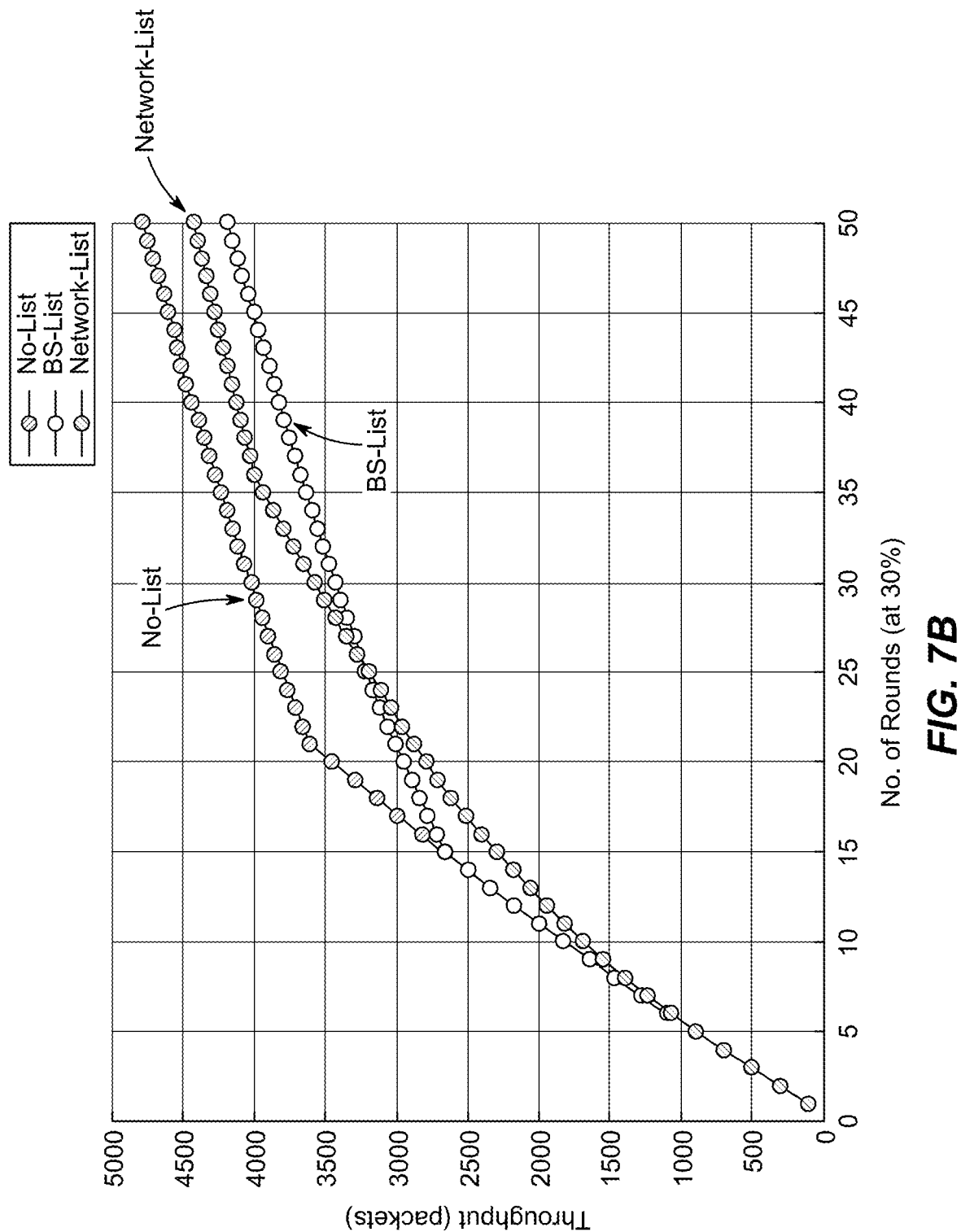
FIG. 7B illustrates the network lifetime for TNS( ) with all nodes, TNS( ) with BS nodes and MST without Tabu for energy level 30%.
Figure 8:
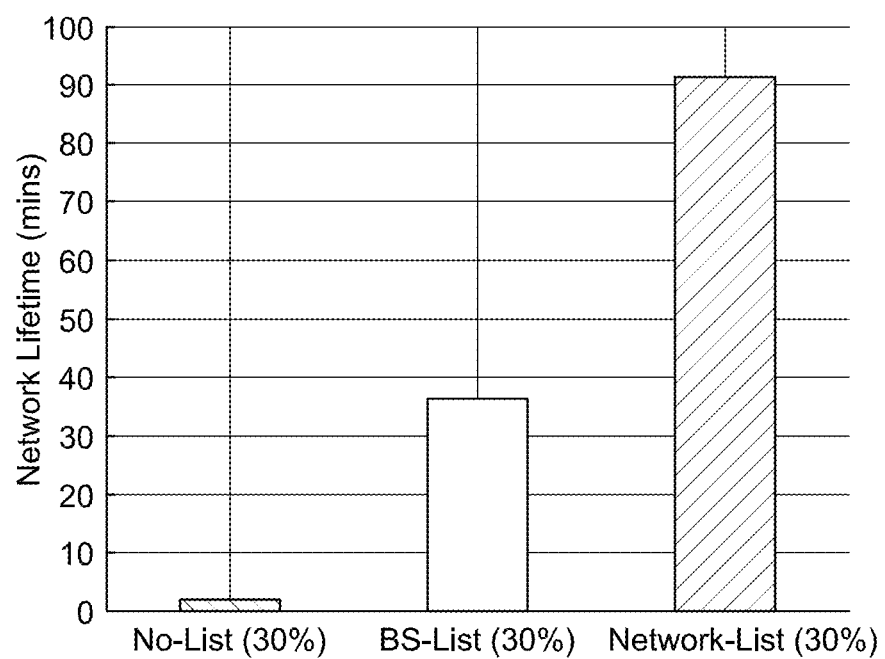
FIG. 8 illustrates the Residual Energy for TNS( ) with all nodes, TNS( ) with BS nodes and MST without Tabu for energy level 30%.

FIGS. 7A, 7B and 8 represent the experiments of TNS( ) when the energy level to be reached by nodes is 30% in order to be added to the Tabu list. No-list has the highest throughput of packets, as expected, as the overhead is lower with less processing. The throughput for the Network-list( ) lies in between the other variants. For the BS-list( ) variant, the nodes disconnect more quickly than other nodes which affects the throughput of the network. In the Network-list( ) nodes having 30% level energy indicates the nodes enter quickly onto the Tabu list, which affected the throughput. More investigations were done for higher energy levels to assess this finding. For the network lifetime depicted in FIG. 8, the Network-list( ) variant at 30% outperforms the No-list and BS-list algorithms as was also shown in FIG. 6C for 10%. This confirms that the residual energy increased since a pseudo optimal node selection was performed for energy balancing.

As shown in FIG. 7A, residual energy at 30% is higher for the Network-list( ) variant. Thus it is more efficient to add nodes to the Tabu list when their energy reaches 30%, than to only enter the base station's neighbor nodes.

Figure 9A:
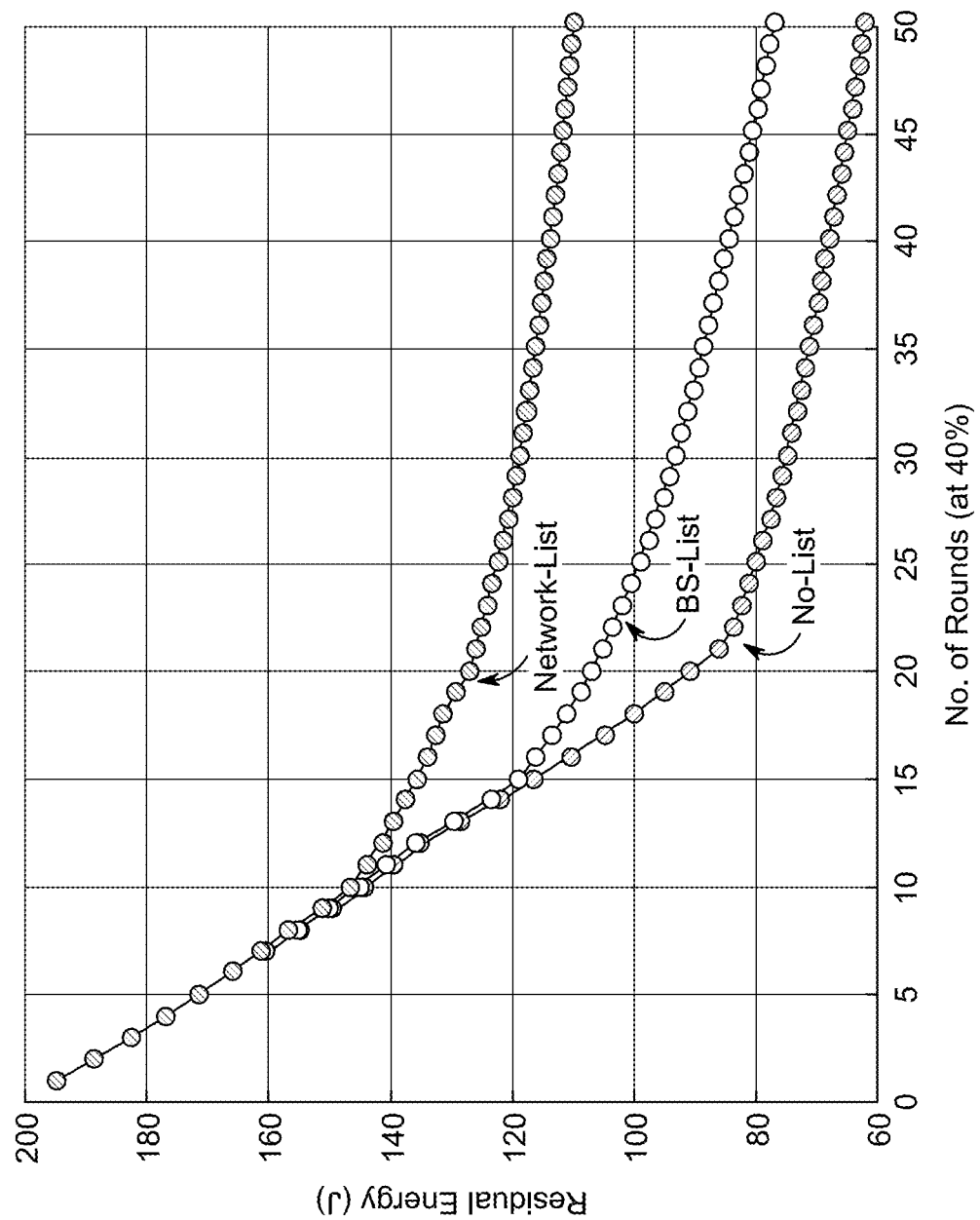
FIG. 9A illustrates the Residual for TNS( ) with all nodes, TNS( ) with BS nodes and MST without Tabu for energy level 40%.
Figure 9B:
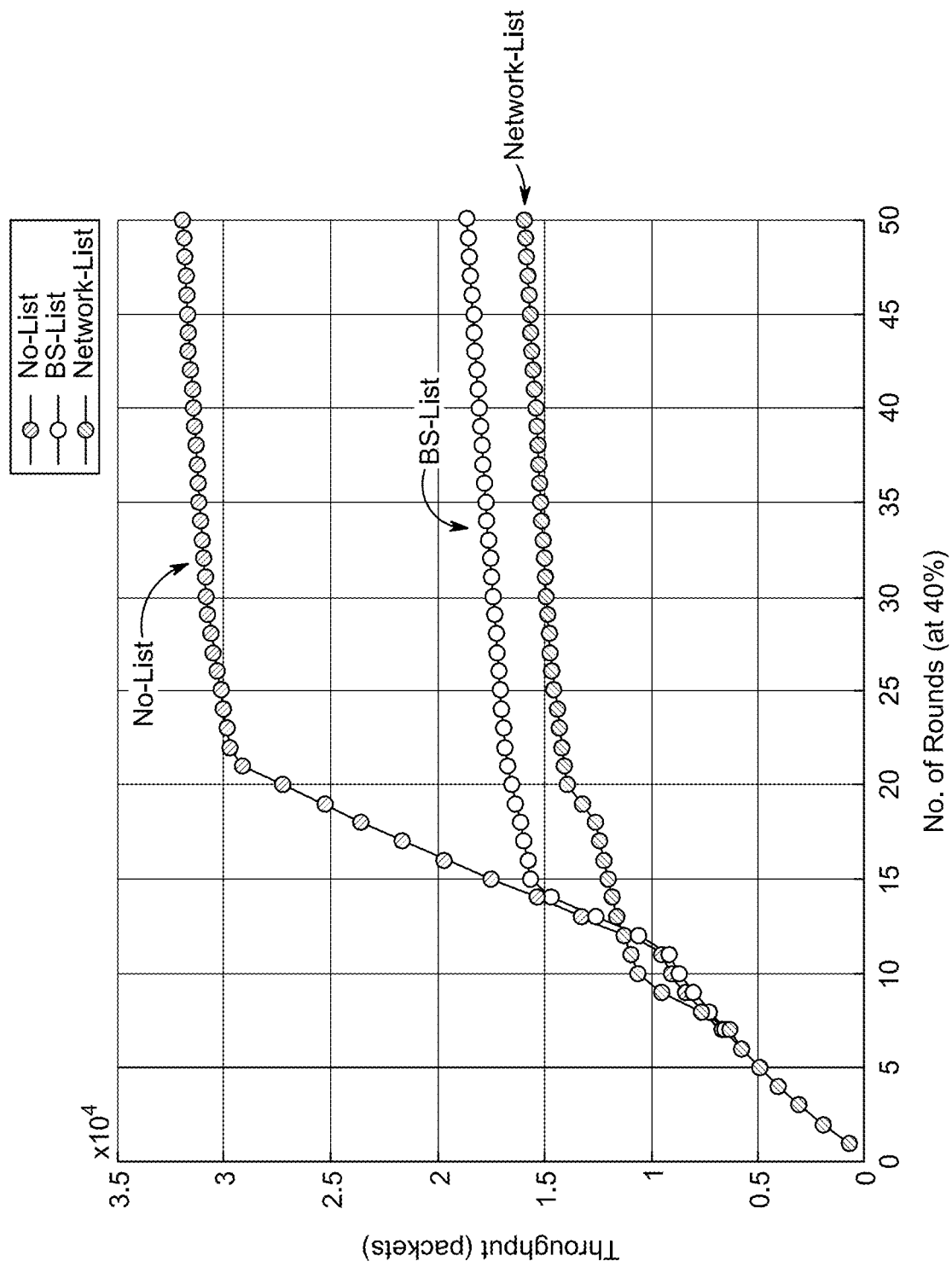
FIG. 9B illustrates the throughput for TNS( ) with all nodes, TNS( ) with BS nodes and MST without Tabu for energy level 40%.
Figure 10:
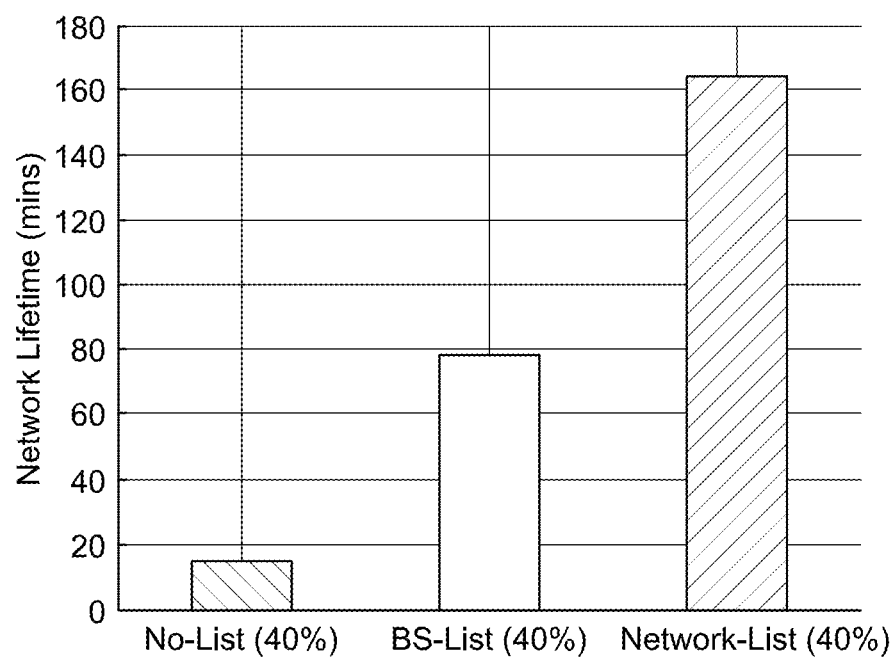
FIG. 10 illustrates the network lifetime for TNS( ) with all nodes, TNS( ) with BS nodes and MST without Tabu for energy level 40%.
Figure 11A:
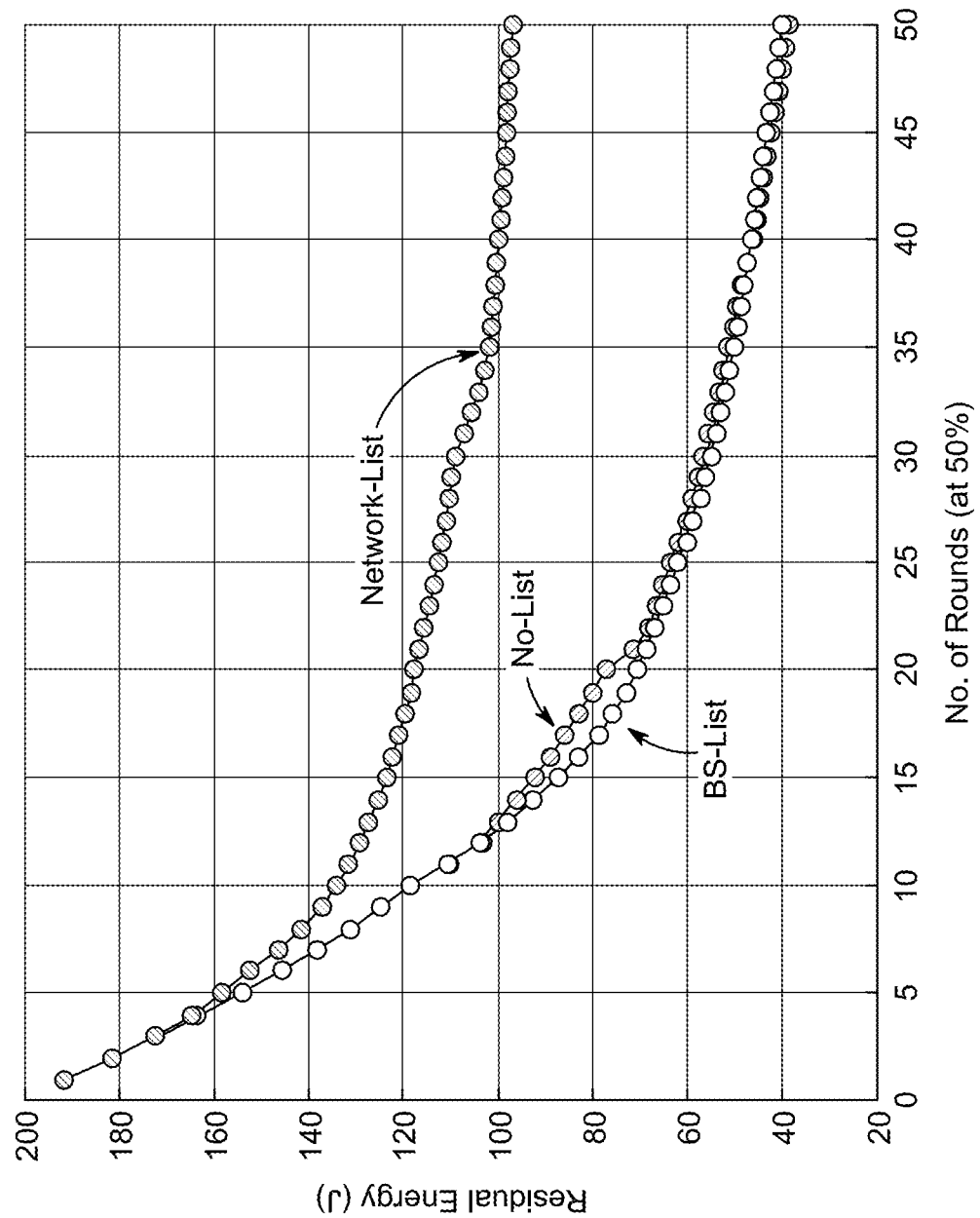
FIG. 11A illustrates the Residual Energy for TNS( ) with all nodes, TNS( ) with BS nodes and MST without Tabu for energy level 50%.
Figure 11B:
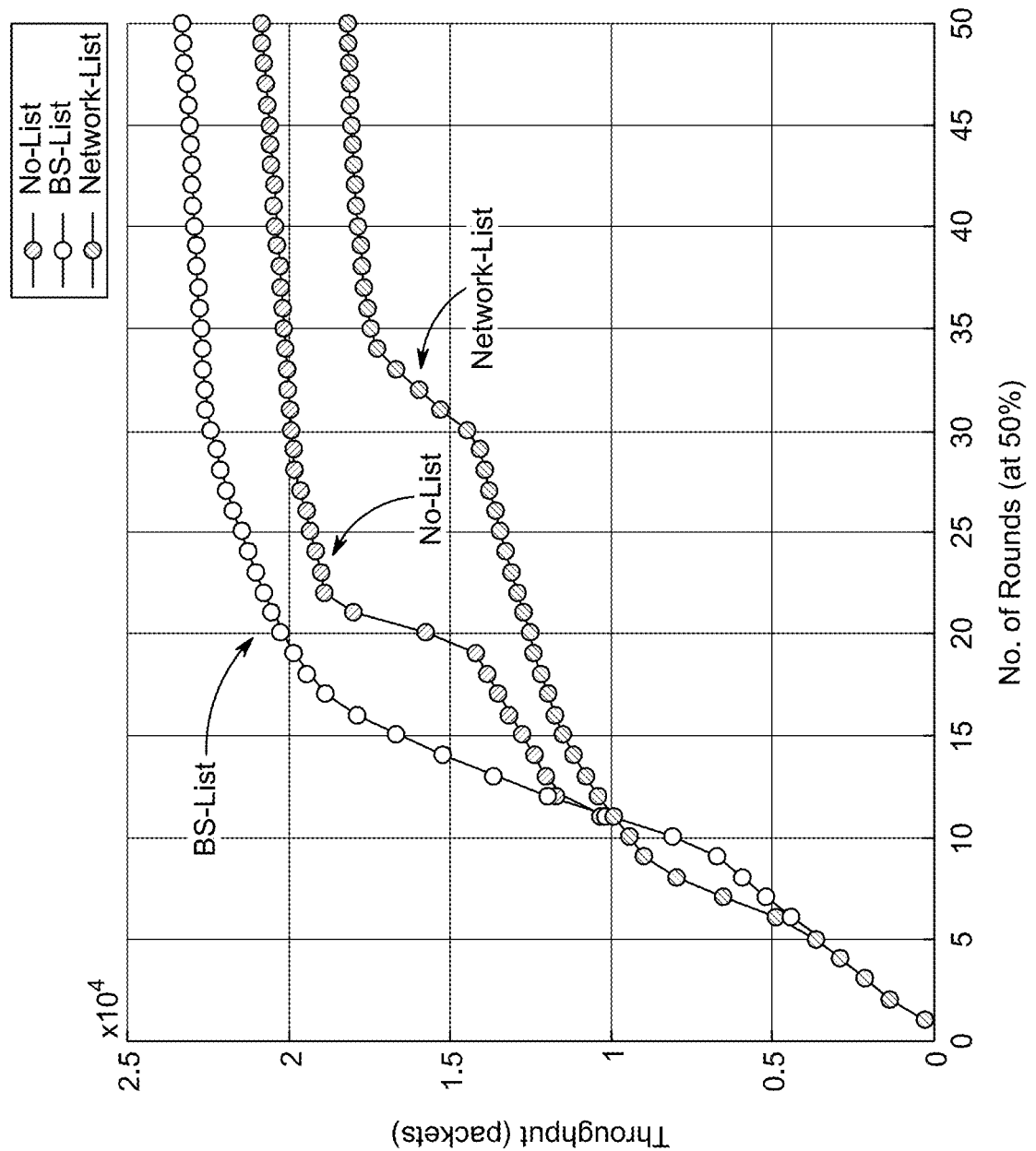
FIG. 11B illustrates the throughput for TNS( ) with all nodes, TNS( ) with BS nodes and MST without Tabu for energy level 50%.
Figure 12:
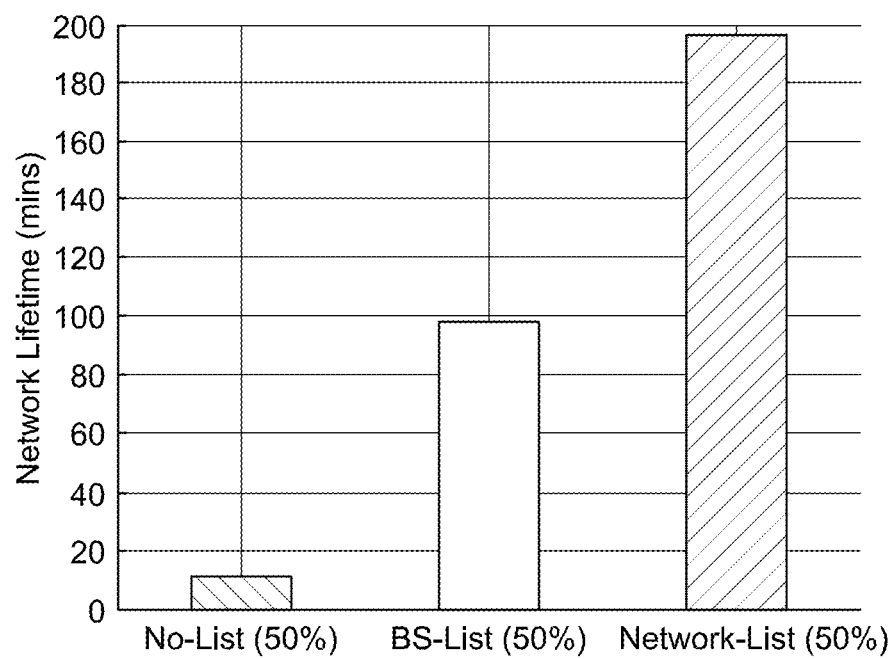
FIG. 12 illustrates the network lifetime for TNS( ) with all nodes, TNS( ) with BS nodes and MST without Tabu for energy level 50%.

For energy levels of 40% and 50%, the observation can be made that the residual energy is much higher for the Network-list( ) algorithm than the B S-List or No-List for greater than ten rounds as shown by FIG. 9A, 11A respectively. However, for network lifetime, the throughput decreased with larger energy levels values, as shown by FIGS. 9B and 11B, respectively. This can be explained by the fact that nodes will be added to the Tabu list quickly, when their energy reaches these levels. As more nodes are placed into the Tabu lists, fewer are available for routing packets, which decreases the throughput. This finding indicates that it would be advisable to set the energy level not more than 30% in the TNS( ) algorithm.

To find the "best" energy level threshold for nodes to belong to the Tabu list, experiments with continuous values of energy levels ranging from 1 to 50% were run. As showed in FIG. 6A-12, the "best" value appears to be 30%. It is clear that the Tabu node selection coupled with the minimum spanning tree algorithm, TNS-MST, provides a tremendous improvement in terms of residual energy and network lifetime. Confirmation was presented that the TNS-MST approach of the present disclosure is beneficial in energy balancing among the WSN sensors.

In wireless sensors networks, the management of nodes energy is crucial to improve the network lifetime. In fact, having an efficient routing protocol coupled with a node management strategy positively impacts network lifetime. In the present disclosure, a Tabu based mechanism was presented to perform energy balancing among the nodes. The nodes are made inactive if their energy reached a certain level. Optimum selection of this level will ensure that the node will not have its energy drained faster than its neighbor nodes. Therefore, the network lifetime increases, since nodes with high data transit are prevented from dying quickly. The experiments showed that Tabu based approach coupled with Minimum Spanning Tree routing increased significantly network lifetime. These results confirm that performing energy balancing at the level of nodes will affect positively the network lifetime and increase residual energy.

Figure 13:
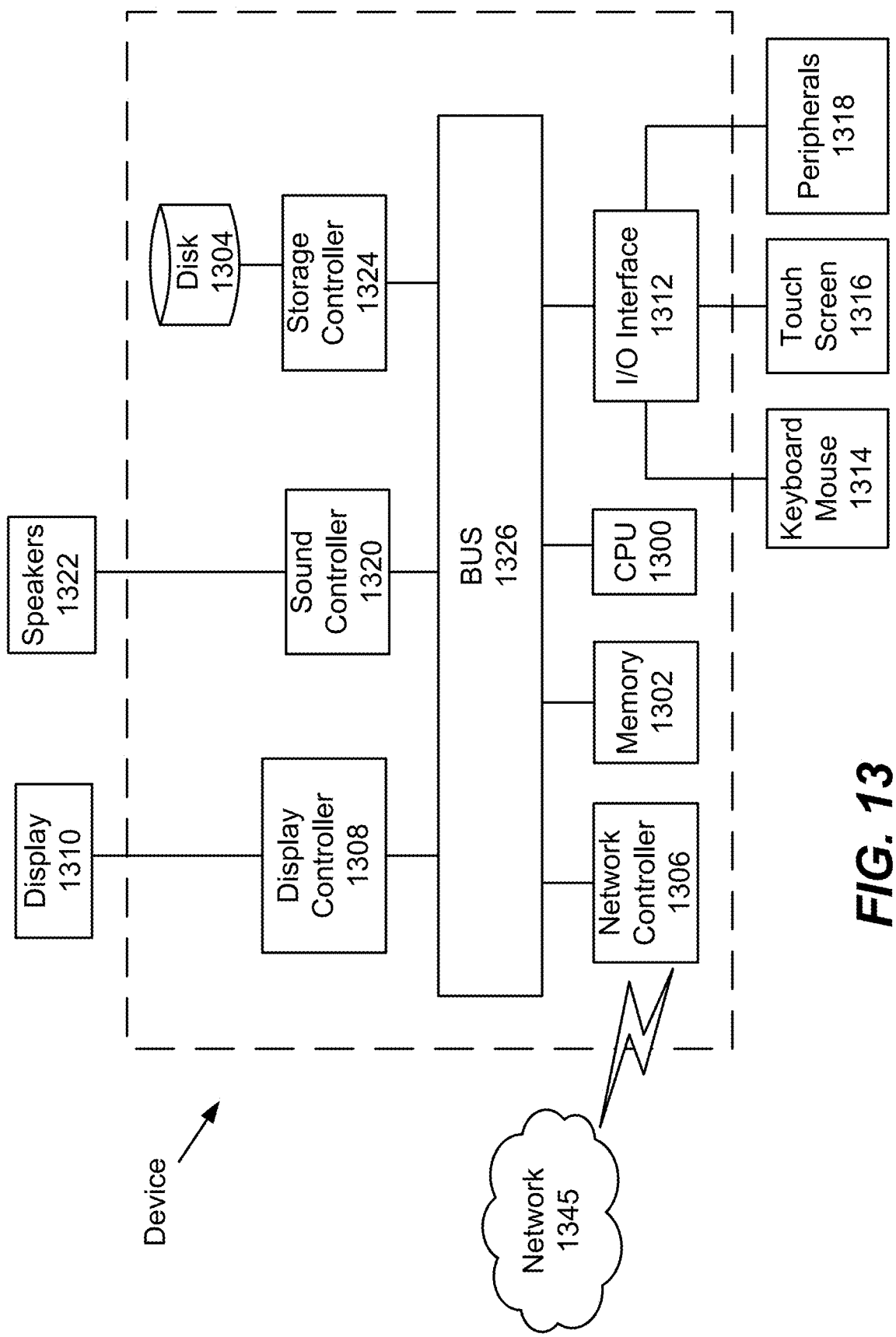
FIG. 13 is an illustration of a non-limiting example of details of computing hardware used in the computing system, according to certain embodiments.

Next, a hardware description of the controller 662 according to exemplary embodiments is described with reference to FIG. 13. In FIG. 13, the controller described is representative of the control unit 540 of FIG. 5, in which the controller 544 is a computing device which includes a CPU 1300 which performs the processes described above/below. The process data and instructions may be stored in memory 1302. These processes and instructions may also be stored on a storage medium disk 1304 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 1300 and an operating system such as Microsoft Windows 7, UNIX, Solaris, LINUX7, Apple MAC-OS and other systems known to those skilled in the art.

The hardware elements in order to achieve the computing device may be realized by various circuitry elements, known to those skilled in the art. For example, CPU 1300 may be a Xenon or Core processor from Intel of America or an Opteron processor from AMD of America, or may be other processor types that would be recognized by one of ordinary skill in the art. Alternatively, the CPU 1300 may be implemented on an FPGA, ASIC, PLD or using discrete logic circuits, as one of ordinary skill in the art would recognize. Further, CPU 1300 may be implemented as multiple processors cooperatively working in parallel to perform the instructions of the inventive processes described above.

The computing device in FIG. 13 also includes a network controller 1306, such as an Intel Ethernet PRO network interface card from Intel Corporation of America, for interfacing with network 1345. As can be appreciated, the network 1345 can be a public network, such as the Internet, or a private network such as an LAN or WAN network, or any combination thereof and can also include PSTN or ISDN sub-networks. The network 1345 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1308, such as a NVIDIA GeForce GT13 or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard. A sound controller 1320 is also provided in the computing device such as Sound Blaster X-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
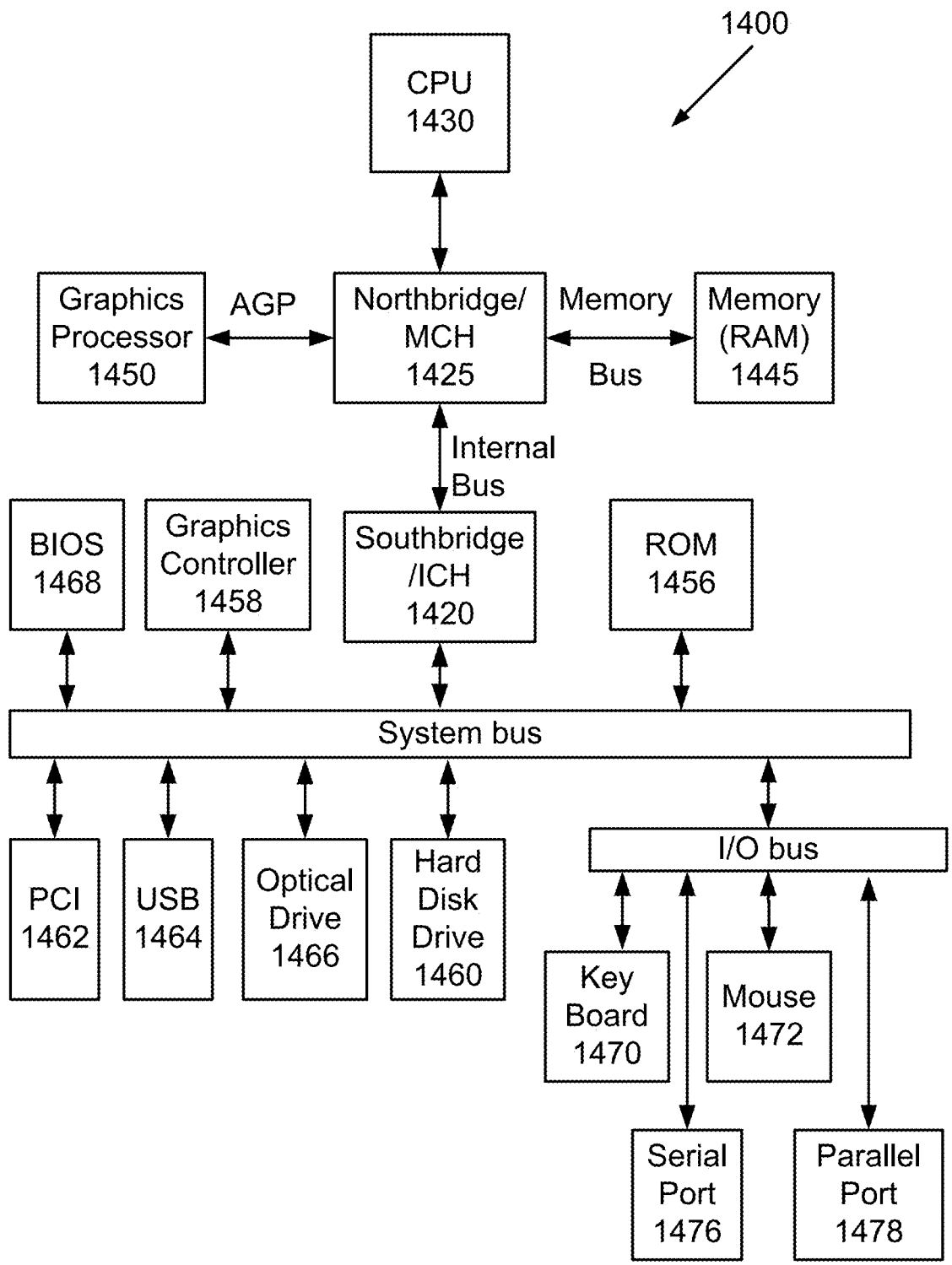
FIG. 14 is an exemplary schematic diagram of a data processing system used within the computing system, according to certain embodiments.

FIG. 14 shows a schematic diagram of a data processing system, according to certain embodiments, for performing the functions of the exemplary embodiments. The data processing system is an example of a computer in which code or instructions implementing the processes of the illustrative embodiments may be located.

In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU Processing unit 1430 may contain one or more processors and even may be implemented using one or more heterogeneous processor systems.

Figure 15:
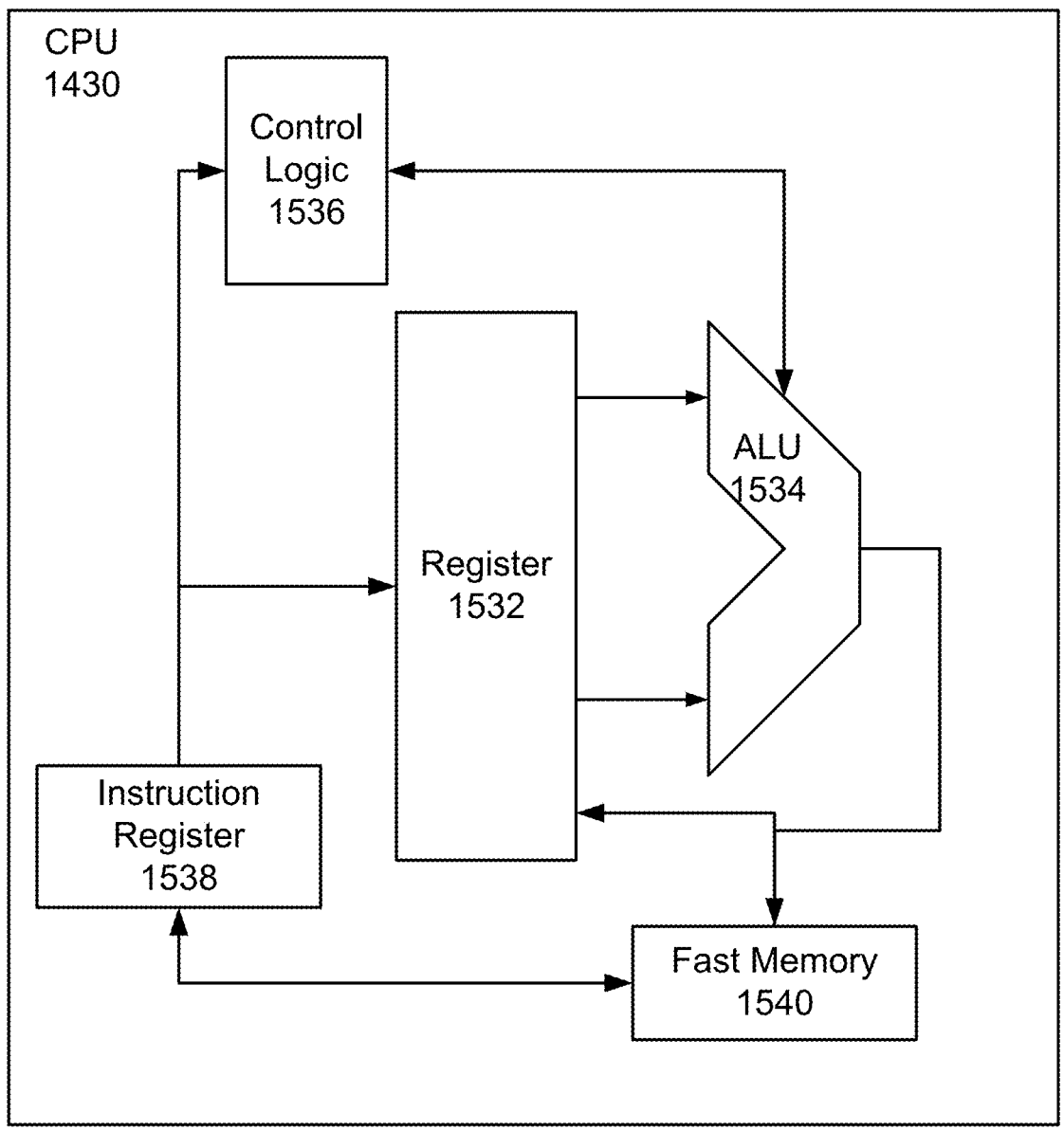
FIG. 15 shows an implementation of a CPU of the computing device, according to certain embodiments.

For example, FIG. 15 shows one implementation of CPU 1430. In one implementation, the instruction register 1538 retrieves instructions from the fast memory 1540. At least part of these instructions are fetched from the instruction register 1538 by the control logic 1536 and interpreted according to the instruction set architecture of the CPU 830. Part of the instructions can also be directed to the register 1532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540.

According to certain implementations, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1420 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to SB/ICH 1420 through a PCI bus 1462.

The PCI devices may include, for example, Ethernet adapters, add-in cards, and PC cards for notebook computers. The Hard disk drive 1460 and CD-ROM 1466 can use, for example, an integrated drive electronics (IDE) or serial advanced technology attachment (SATA) interface. In one implementation the I/O bus can include a super I/O (SIO) device.

Further, the hard disk drive (HDD) 1460 and optical drive 1466 can also be coupled to the SB/ICH 1420 through a system bus. In one implementation, a keyboard 1470, a mouse 1472, a parallel port 1478, and a serial port 1476 can be connected to the system bus through the I/O bus. Other peripherals and devices that can be connected to the SB/ICH 1420 using a mass storage controller such as SATA or PATA, an Ethernet port, an ISA bus, a LPC bridge, Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 16:
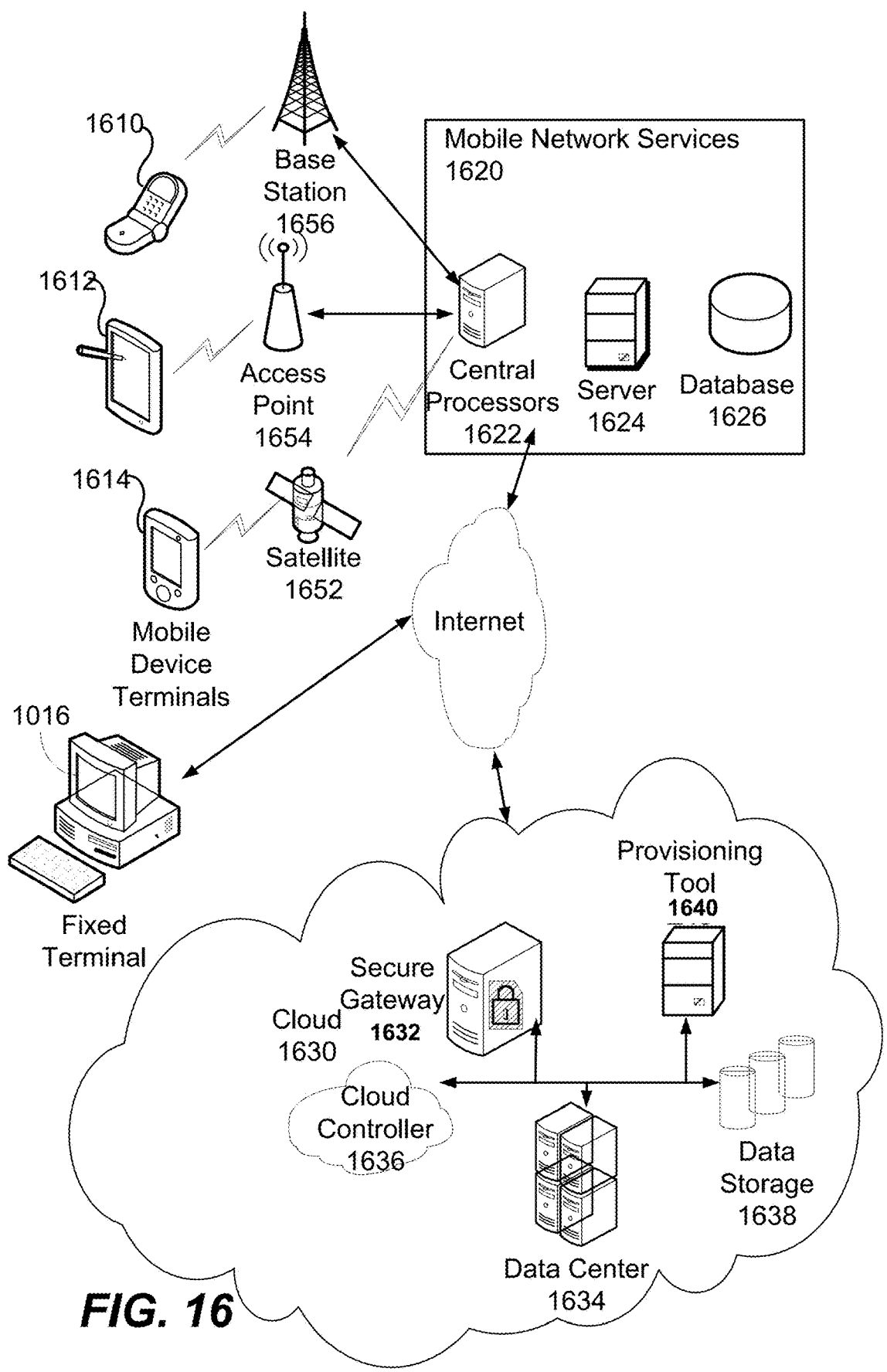
FIG. 16 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for node selection in a wireless sensor network, comprising:
   determining a minimum path between a first sensor node and a destination node;
   routing a communications packet along the minimum path from the first sensor node to a next sensor node based on the energy level of the next sensor node being greater than a threshold energy level;
   placing the sensor nodes for which the energy level is below the threshold energy level on a routing list of inactive nodes;
   placing the sensor nodes for which the energy level is below the threshold energy level on a Tabu list;
   turning off the sensor nodes along the minimum path for which the energy level is equal to or below the threshold energy level; and
   continuing to route the communication packet along the minimum path to each next sensor node until the destination node is reached.

2. The method of claim 1, wherein either the first sensor node or the destination node is a base station.

3. The method of claim 1, further comprising:
   routing the communications packet along the minimum path based on a minimum spanning tree algorithm.

4. The method of claim 1, further comprising:
   routing the communications packet along the minimum path based on a minimum spanning tree algorithm, wherein the minimum spanning tree algorithm is PRIM's algorithm.

5. The method of claim 1, further comprising:
   selecting the next sensor node from any one of the sensor nodes within a communications distance of the first sensor node,
   wherein the next sensor node is not listed on the Tabu list, and
   wherein the communications distance is based at least partially on the energy level of the first sensor node.

6. The method of claim 1, further comprising:
   removing a sensor node from the Tabu list if the energy level of the sensor node equals the energy level of at least one neighboring sensor node.

7. The method of claim 1, further comprising:
   removing a sensor node from the Tabu list when there is no minimum path connecting the first sensor node to the destination node.

8. The method of claim 1, further comprising:
   removing the sensor nodes from the Tabu list when all the sensor nodes of the wireless sensor network are on the Tabu list.

9. The method of claim 1, further comprising:
   selecting, by a processor, the energy level threshold from a set of descending energy level thresholds.

10. The method of claim 9, further comprising:
    lowering the threshold energy level when all the sensor nodes are on the Tabu list; and
    removing sensor nodes from the Tabu list which are above the lowered threshold energy level.

11. The method of claim 1, further comprising:
    determining a minimum path to the destination node for each sensor node in the wireless sensor network which is not listed on the routing list of inactive nodes.

12. The method of claim 11, further comprising:
    balancing the energy, increasing the residual energy and increasing the lifetime of the wireless sensor network by turning off the sensor nodes along each minimum path for which the energy level is equal to or below the threshold energy level.

13. A system for node selection in a wireless sensor network including a plurality of sensor nodes and a destination node, comprising:
    turning off, by a processor including a Tabu search module, sensor nodes for which the energy level is equal to or below the threshold energy level and placing those sensor nodes on a Tabu routing list;
    determining, by a processor including a minimum spanning tree module, a minimum path between a first sensor node and the destination node, wherein the minimum path includes only those nodes not on the Tabu routing list;
    routing, by a computing system connected to the processor, a communications packet along the minimum path from the first sensor node to a next sensor node on the minimum path;
    continuing to route the communication packet along the minimum path to each next sensor node until the destination node is reached; and
    continuing the determining for each sensor node in the wireless sensor network until all of the sensor nodes have either been assigned a minimum path or have been turned off.

14. The system of claim 13, further comprising at least one of:
    removing a sensor node from the Tabu list if the energy level of the sensor node equals the energy level of at least one neighboring sensor node; or
    removing all of the sensor nodes from the Tabu list when all of the sensor nodes in the wireless sensor network are on the Tabu list.

15. The system of claim 13, further comprising:
    selecting, by the processor, the energy level threshold from a set of descending energy level thresholds.

16. The system of claim 13, further comprising:
    lowering the threshold energy level when all the sensor nodes are on the Tabu list; and
    removing the sensor nodes from the Tabu list which are above the lowered threshold energy level.

17. The system of claim 13, further comprising:
    balancing the energy, increasing the residual energy and increasing the lifetime of the wireless sensor network by turning off the sensor nodes along each minimum path for which the energy level is equal to or below the threshold energy level.

18. A non-transitory computer readable medium having instructions stored therein that, when executed by one or more processor, cause the one or more processors to perform a method for node selection in a wireless sensor network including a plurality of sensor nodes and a destination node, comprising:
    turning off, by a processor including a Tabu search module, sensor nodes for which the energy level is equal to or below the threshold energy level and placing those sensor nodes on a Tabu routing list;

determining, by a processor including a minimum spanning tree module, a minimum path between a first sensor node and the destination node, wherein the minimum path includes only those nodes not on the Tabu routing list;

routing, by a computing system connected to the processor, a communications packet along the minimum path from the first sensor node to a next sensor node on the minimum path;

continuing to route the communication packet along the minimum path to each next sensor node until the destination node is reached; and continuing the determining for each sensor node in the wireless sensor network until all of the sensor nodes have either been assigned a minimum path or have been turned off.

* * * * *